US011353106B2

(12) United States Patent
Weinhardt

(10) Patent No.: US 11,353,106 B2
(45) Date of Patent: *Jun. 7, 2022

(54) HYDRAULIC SYSTEM FOR AN AUTOMATIC TRANSMISSION OF A MOTOR VEHICLE

(71) Applicant: AUDI AG, Ingolstadt (DE)

(72) Inventor: Mathias Weinhardt, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 780 days.

This patent is subject to a terminal disclaimer.

(21) Appl. No.: 16/322,677

(22) PCT Filed: Jul. 31, 2017

(86) PCT No.: PCT/EP2017/069338
§ 371 (c)(1),
(2) Date: Feb. 1, 2019

(87) PCT Pub. No.: WO2018/024682
PCT Pub. Date: Feb. 8, 2018

(65) Prior Publication Data
US 2021/0381590 A1 Dec. 9, 2021

(30) Foreign Application Priority Data

Aug. 3, 2016 (DE) .................. 10 2016 214 364.6

(51) Int. Cl.
F16H 61/00 (2006.01)
F16H 61/12 (2010.01)
(Continued)

(52) U.S. Cl.
CPC ......... F16H 61/12 (2013.01); F16H 61/0025 (2013.01); F16H 61/30 (2013.01);
(Continued)

(58) Field of Classification Search
CPC ...... F16H 61/12; F16H 61/0025; F16H 61/30; F16H 63/3023; F16H 2061/0034;
(Continued)

(56) References Cited

U.S. PATENT DOCUMENTS

2012/0138408 A1* 6/2012 Moorman ........... F16H 61/2807
192/48.601
2015/0247571 A1 9/2015 Ammler
(Continued)

FOREIGN PATENT DOCUMENTS

CN 104879489 A 9/2015
CN 105026798 A 11/2015
(Continued)

OTHER PUBLICATIONS

Chinese Office Action dated Jun. 16, 2020, in connection with corresponding CN Application No. 201780048836.0 (8 pp., including machine-generated English translation).

(Continued)

Primary Examiner — Tisha D Lewis
(74) Attorney, Agent, or Firm — Maier & Maier, PLLC

(57) ABSTRACT

A hydraulic system for an automatic transmission of a motor vehicle. A high pressure circuit in which a pressure accumulator, at least one clutch as well as gear selectors and at least one hydraulic pump are arranged, which can be controlled by an electronic control unit. The pressure accumulator can be connected to a hydraulic positioning cylinder via at least one hydraulic path, wherein a control valve that can be controlled by the control unit is arranged upstream thereof, with which a hydraulic pressure at the hydraulic positioning cylinder can be adjusted, and which control valve can be moved between two through-flow positions in order to move a piston in opposing piston strokes via (Continued)

opposing piston travel paths as well as piston speeds in the hydraulic positioning cylinder.

11 Claims, 16 Drawing Sheets

(51) Int. Cl.
*F16H 61/30* (2006.01)
*F16H 63/30* (2006.01)

(52) U.S. Cl.
CPC . *F16H 63/3023* (2013.01); *F16H 2061/0034* (2013.01); *F16H 2061/1208* (2013.01); *F16H 2061/1264* (2013.01); *F16H 2061/305* (2013.01)

(58) Field of Classification Search
CPC ..... F16H 2061/1208; F16H 2061/1264; F16H 2061/305
See application file for complete search history.

(56) References Cited

U.S. PATENT DOCUMENTS

| | | |
|---|---|---|
| 2016/0003347 A1 | 1/2016 | Bartl |
| 2016/0091086 A1 | 3/2016 | Bartl |
| 2016/0108977 A1 | 4/2016 | Ammler |
| 2021/0356038 A1* | 11/2021 | Weinhardt ............... F16H 61/12 |

FOREIGN PATENT DOCUMENTS

| | | |
|---|---|---|
| CN | 105229343 A | 1/2016 |
| CN | 105229345 A | 1/2016 |
| DE | 102007037589 A1 | 2/2009 |
| DE | 102011100799 A1 | 11/2012 |
| DE | 102013003894 A1 | 9/2014 |
| DE | 102013008701 B3 | 10/2014 |
| DE | 102013210907 A1 | 12/2014 |
| DE | 102014003083 A1 | 9/2015 |
| EP | 1860349 A1 | 11/2007 |
| EP | 2918874 A1 | 9/2015 |
| JP | 2000205141 A | 7/2000 |

OTHER PUBLICATIONS

Office Action dated Jan. 15, 2020 in corresponding Chinese Application No. 201780048836.0; 18 pages including English-language translation.

Examination Report dated Apr. 3, 2017 of corresponding German application No. 10 2016 214 364.6; 13 pages.

International Search Report and Written Opinion of the International Search Authority dated Oct. 19, 2017 in corresponding International application No. PCT/EP2017/069338; 18 pages including English-language Translation Attached.

International Preliminary Report on Patentability (Chapter I) dated Feb. 14, 2019, of corresponding International application No. PCT/EP2017/069338; 8 pages.

* cited by examiner

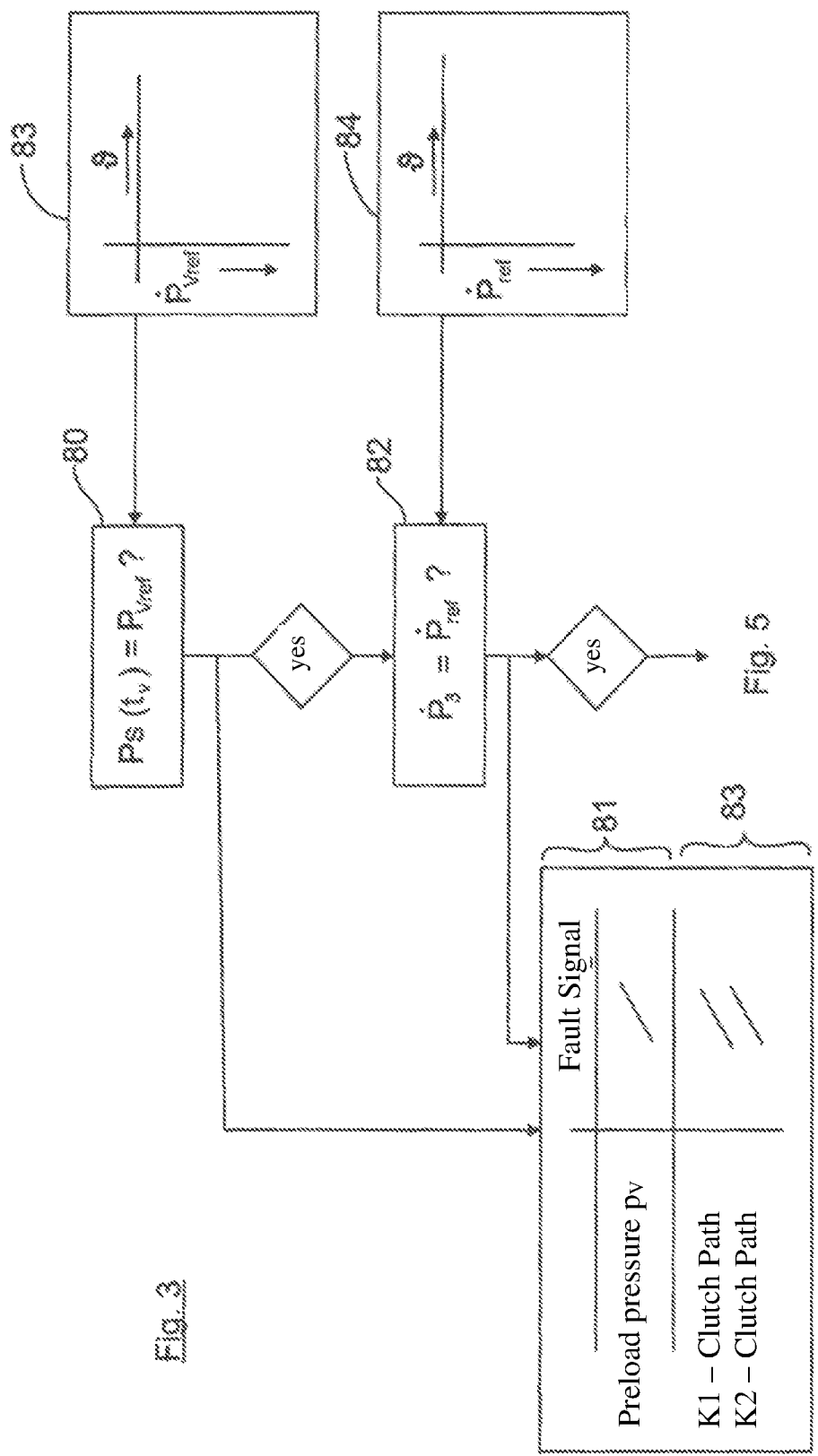

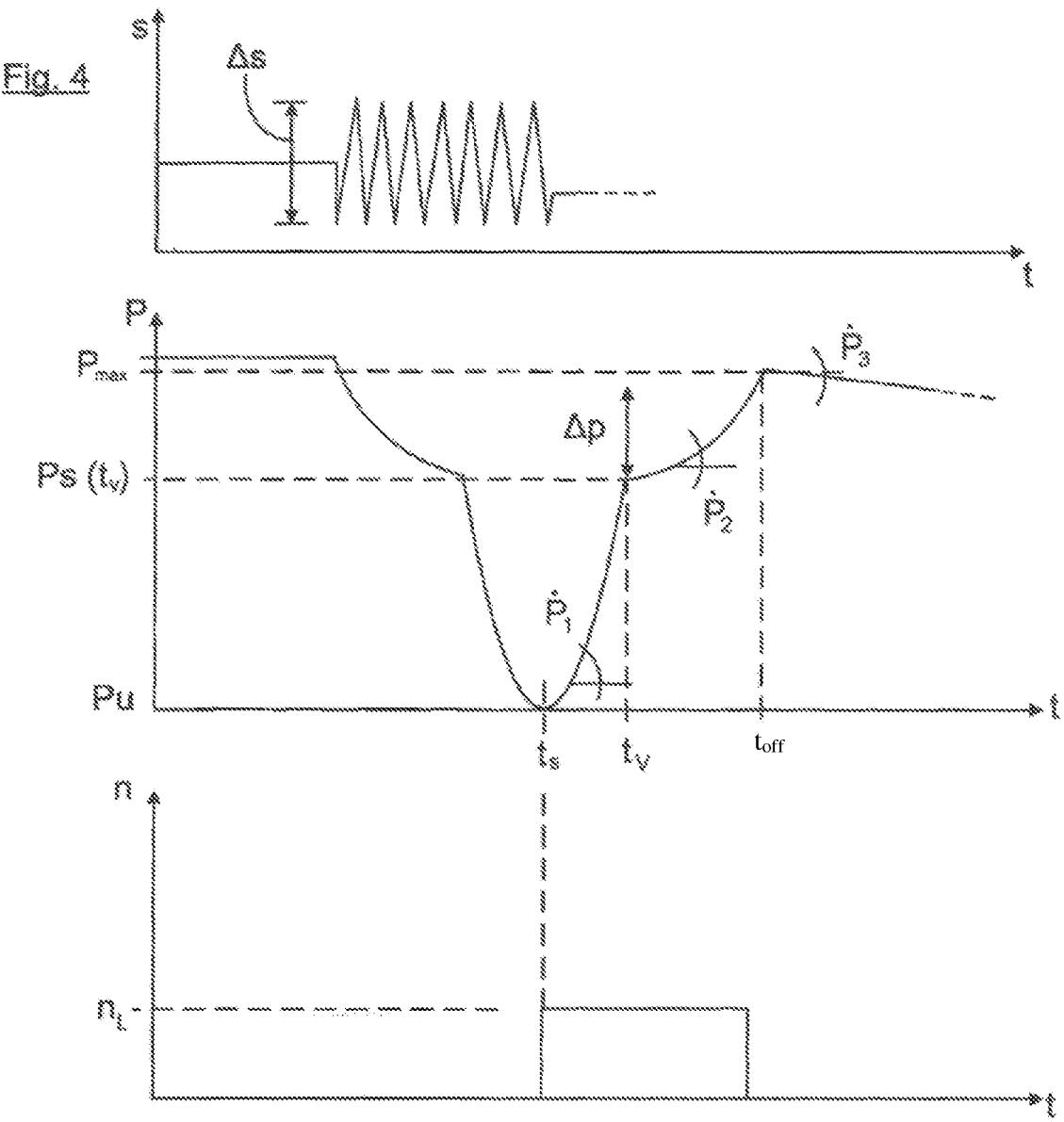

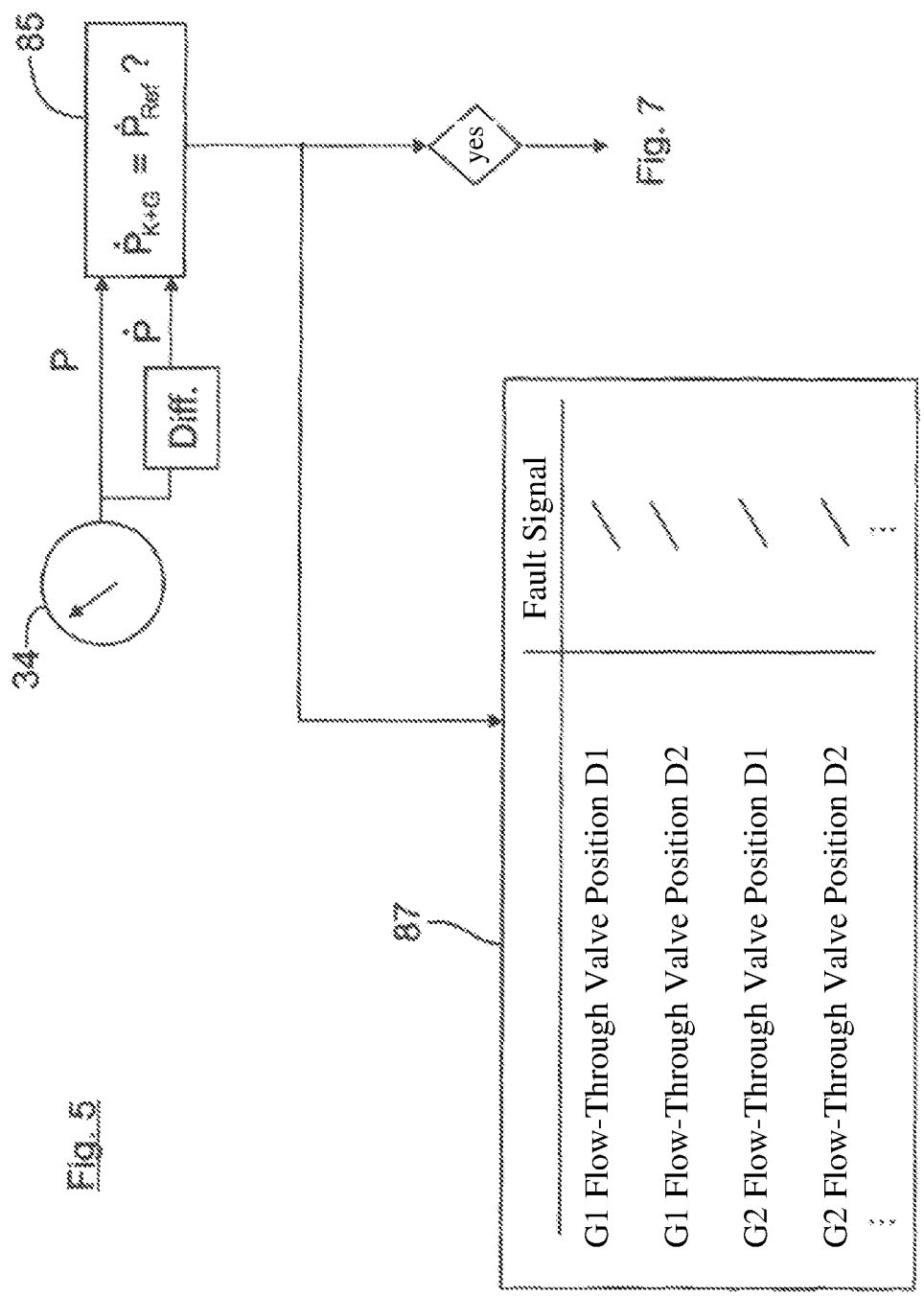

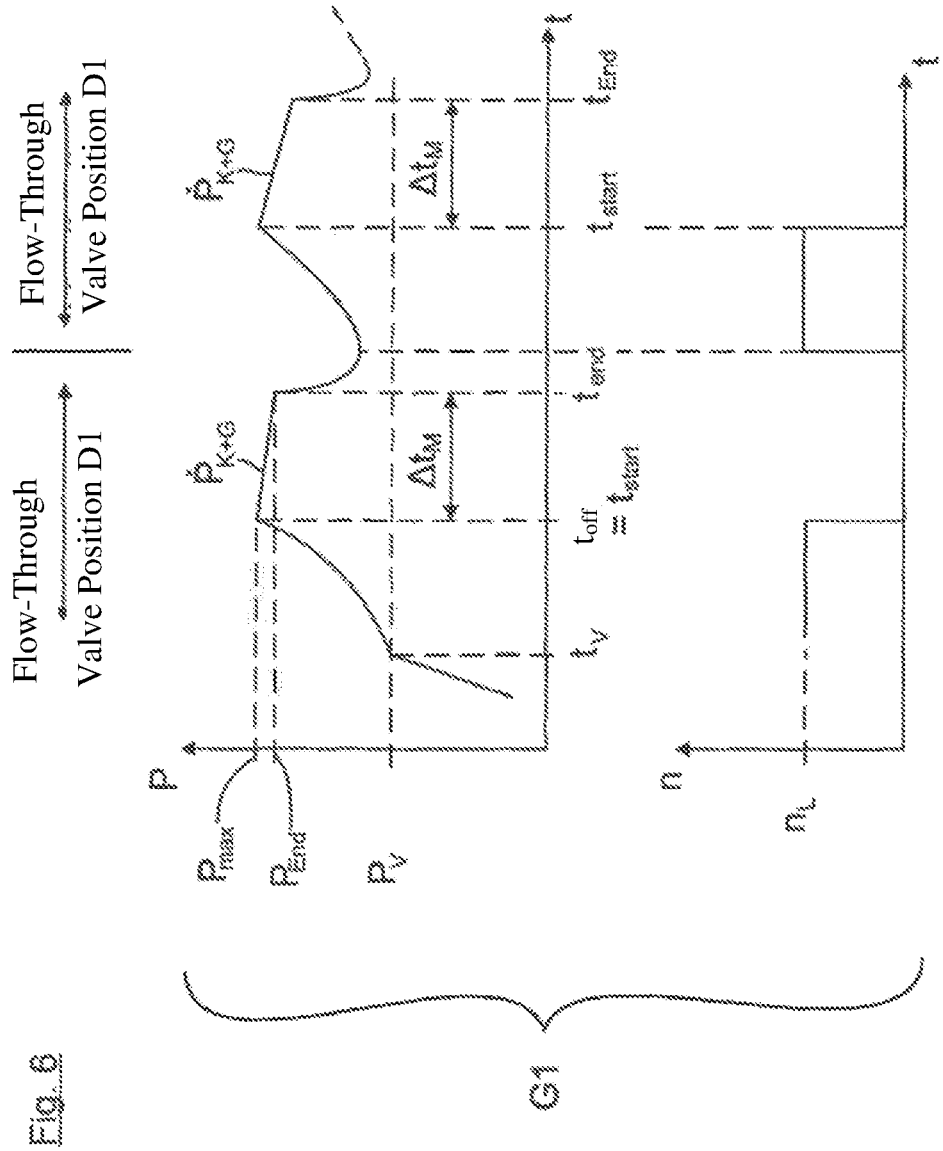

Fig. 13
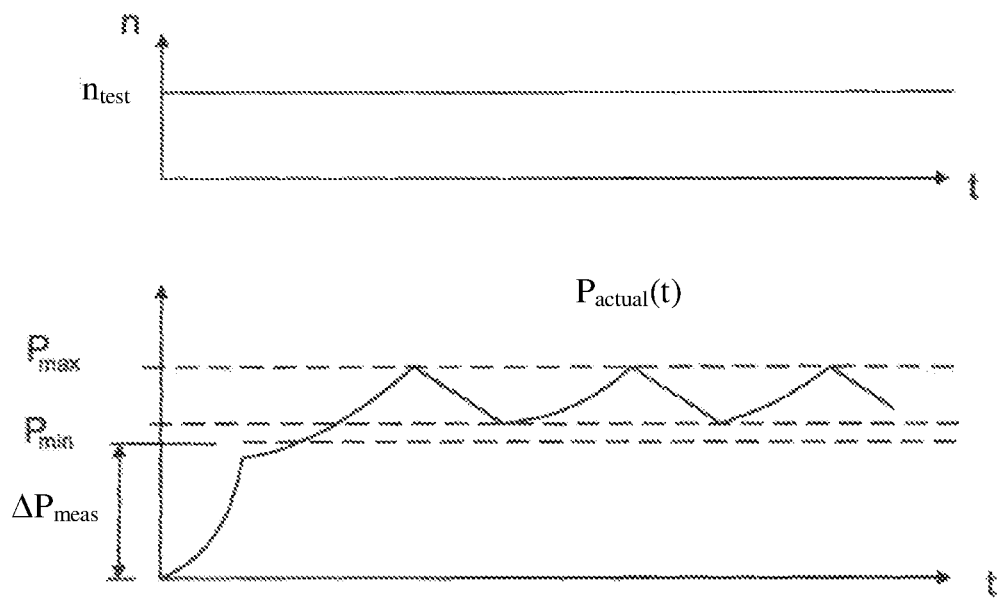
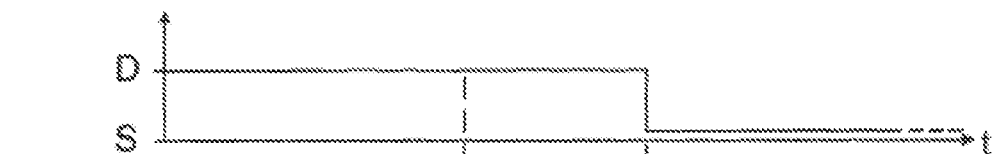
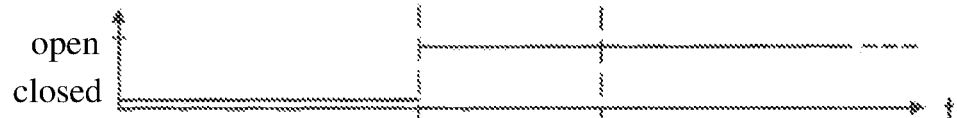
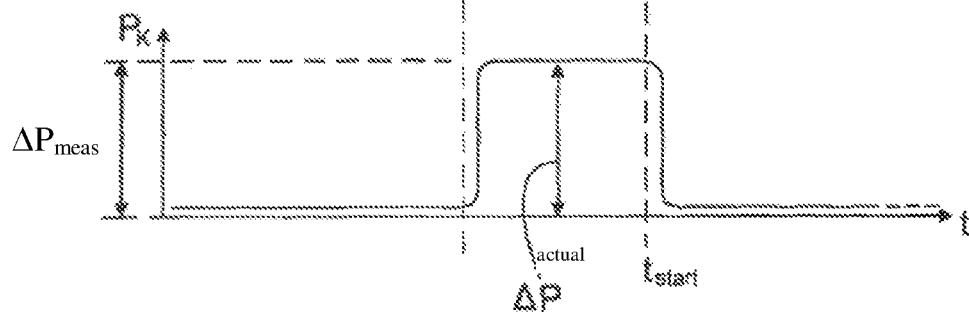

HYDRAULIC SYSTEM FOR AN AUTOMATIC TRANSMISSION OF A MOTOR VEHICLE

FIELD

The invention relates to a hydraulic system for an automatic transmission, more particularly a dual-clutch transmission, of a motor vehicle.

BACKGROUND

In a dual-clutch transmission, two sub-transmissions enable fully automatic gear changes without any interruption of tractive power. Torque is transmitted via one of two clutches, which connects the two sub-transmissions to the drive. The clutches and the gear selectors for engaging the gears are actuated via hydraulic cylinders, which are controlled hydraulically via a hydraulic system.

From DE 10 2014 003 083 A1 a generic hydraulic system is known, which has a pressure accumulator for supplying an accumulator pressure in the hydraulic system. In a clutch path leading from the pressure accumulator to the clutch hydraulic cylinder, a control valve is positioned, which can be controlled by an electronic control unit and can be used to adjust the hydraulic pressure applied to the clutch hydraulic cylinder. The control unit is preferably assigned a pressure sensor (DE 10 2013 003894 A1), with which the hydraulic pressure applied to the clutch hydraulic cylinder can be detected. The hydraulic system also includes a hydraulic charge pump, which delivers hydraulic fluid into the hydraulic system in a charging operation in order to increase the accumulator pressure.

As mentioned above, the electronic control unit of the hydraulic system operates the hydraulic pump at a charging speed upon detecting an accumulator pressure charging demand, in order to increase the accumulator pressure in the hydraulic system, i.e., to charge it. The hydraulic pump can be speed-modulated, i.e., modulated to a predetermined target speed by adapting (increasing or reducing) the actual power consumption. For this purpose, the electric motor of the hydraulic pump can have a speed measuring unit and a power consumption measuring unit, which form a control loop together with the electronic control unit.

For the case in which the hydraulic pump is not assigned a separate volume meter, however, a reliable statement about the actual delivery volume flow actually delivered by the hydraulic pump cannot be made in pump charging operation, whereby the operational reliability of the hydraulic system is impaired in the event of a malfunction of the hydraulic pump.

SUMMARY

The object of the invention is to provide a hydraulic system in which the operational reliability of the hydraulic system can be ensured with reduced sensor system complexity.

The control unit includes a diagnostic module, with which a delivery volume flow diagnosis can be carried out without an additional volume meter. During the delivery volume flow diagnosis, in a diagnosis time interval, the hydraulic pump is operated in a charging operation at a speed. The control valve of a hydraulic positioning cylinder in the hydraulic system is simultaneously operated in one of the flow-through positions. An analysis unit of the diagnostic module determines an actual volume flow on the basis of the piston speed resulting in charging operation and compares it to a target volume flow. If there is a significant deviation, the diagnostic module diagnoses a fault, which can be stored in a delivery volume flow fault memory.

The control valve can be adjusted between two flow-through positions, in order to adjust a piston in opposing piston strokes via opposing piston positioning distances and piston speeds in the respective hydraulic positioning cylinder. Each piston stroke is linked to a hydraulic liquid removal (i.e., displacement volume) from the hydraulic system.

If the internal geometry of the hydraulic positioning cylinder is known, the displacement volume removed per piston stroke can be computed in a simple manner A displacement volume flow removed from the hydraulic system can therefore be determined from the piston speed in the respective piston stroke, which permits inferences about the delivery volume flow of the hydraulic pump under predefined boundary conditions. The above-mentioned piston speed can be determined easily by a sensor system, for example, by means of a position sensor described hereafter, which detects the piston strokes of the hydraulic positioning cylinder.

The invention is based on the substantive matter that in the hydraulic system, both the gear selectors and also the clutches include clutch and gear selector hydraulic cylinders, which can each be operated via an assigned clutch valve or gear selector valve which can be used as control valves for the delivery volume flow diagnosis. In a simple technical implementation, the hydraulic positioning cylinder used for the delivery volume flow diagnosis can be a gear selector hydraulic cylinder, from which a gear selector valve is connected upstream as a control valve, with which the hydraulic pressure applied to the gear selector hydraulic cylinder can be adjusted.

To avoid measurement inaccuracies in the determination of the delivery volume flow, it is relevant that the accumulator pressure prevailing in the high-pressure circuit in the hydraulic path is kept constant. In this manner, it is ensured that during the diagnosis, the pump delivery power is not utilized for an additional pressure buildup of the accumulator pressure in the high-pressure circuit. It is metrologically particularly advantageous if the accumulator pressure is at ambient pressure during the diagnosis time interval, i.e., the high-pressure circuit is depressurized. It is favorable with respect the sensor system if the pressure sensor arranged in the clutch path is used during the delivery volume flow diagnosis for detecting the actual accumulator pressure. In this case, the pressure sensor monitors that the high-pressure circuit has a constant accumulator pressure or preferably remains depressurized during the diagnosis time interval.

To lower the accumulator pressure in the high-pressure circuit to an ambient pressure in a simple manner, it is preferable if the pressure accumulator is completely drained before the start of the diagnosis time interval. The reduction of the actual accumulator pressure to the ambient pressure can preferably take place in a pressure reducer time interval, which is before the actual diagnosis time interval with respect to time. The hydraulic pump is deactivated in the pressure reducer time interval. At the same time, the hydraulic positioning cylinder (i.e., the gear selector hydraulic cylinder) is actuated by operating its control valve until the ambient pressure is reached in the hydraulic system because of leakage-induced hydraulic liquid removal and because of actuation-induced hydraulic liquid removal.

The presence of ambient pressure in the high-pressure circuit can be determined in an operationally-reliable manner with the aid of the position sensor. For the case in which the position sensor no longer detects piston stroke travel in spite of corresponding (pulsating) operation of the control valve, the control unit detects that ambient pressure is present in the high-pressure circuit.

To obtain the most accurate possible measurement result during the diagnosis time interval, it is preferable if the piston speeds of a plurality of piston strokes are detected, and specifically preferably at different test speeds of the hydraulic pump. The analysis unit can form a piston speed mean value from the plurality of detected data, from which the actual delivery volume flow of the hydraulic pump may be calculated.

The advantageous embodiments and/or refinements of the invention described above and/or reflected in the dependent claims may be used individually or in any desired combination with one another except, for example, in the case of clear dependencies or incompatible alternatives.

BRIEF DESCRIPTION OF THE DRAWINGS

In the following, the invention and its advantageous embodiments and refinements along with the advantages thereof will be described in greater detail with reference to the drawings.

In the drawings:

FIG. 3 is a block diagram showing the program blocks required for pressure accumulator and clutch path diagnosis in a diagnostic module; and FIG. 4 contains graphs illustrating the pressure accumulator and clutch path diagnosis;

FIG. 5 is a block diagram showing the program blocks required for gear selector path diagnosis in the diagnostic module;

FIG. 6 contains graphs illustrating the gear selector path diagnosis;

FIG. 13 contains graphs illustrating the profiles over time of relevant parameters during safety valve diagnosis;

DETAILED DESCRIPTION

Figure 1:
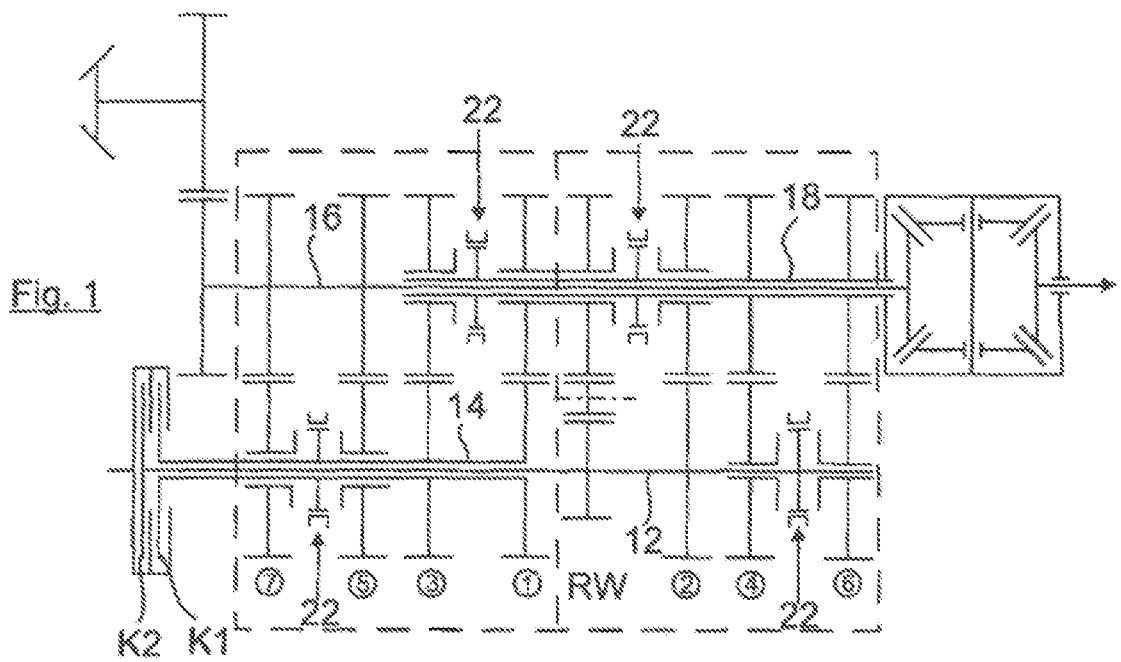
FIG. 1 is a block diagram of a dual-clutch transmission for a motor vehicle having seven forward gears and one reverse gear.

FIG. 1 is a schematic diagram of a dual-clutch transmission for a motor vehicle with all-wheel drive. This dual-clutch transmission has seven forward gears (see circled numerals 1 through 7) and one reverse gear RW. In the following, the dual-clutch transmission will be described only insofar as is necessary for an understanding of the invention. The dual-clutch transmission has two input shafts 12, 14, which are arranged coaxially to one another and can be connected to the drive source, for example an internal combustion engine, alternatingly, via two hydraulically actuated multi-plate clutches K1, K2. Input shaft 14 is embodied as a hollow shaft, in which input shaft 12, embodied as a solid shaft, is guided. The two input shafts 12, 14 drive an axially parallel output shaft 16 and an intermediate shaft 18 embodied as a hollow shaft via gear sets of the forward gears and of the reverse gear. The gear sets of forward gears 1 through 7 each have fixed gears and movable gears that can be shifted via hydraulically actuated gear selectors. The gear selectors may be dual-synchronizer clutches, for example, each of which is capable of switching two neighboring movable gears from a neutral position.

Figure 2B:
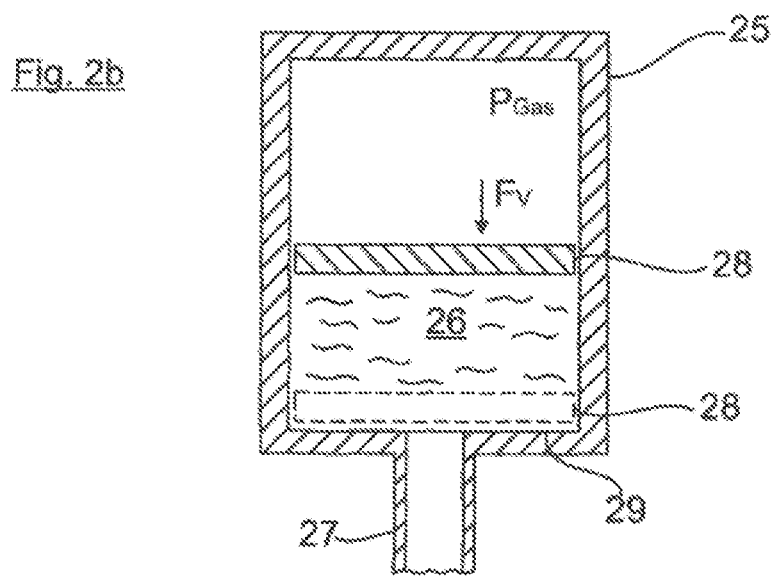
FIG. 2b shows another diagram of a hydraulic system of a dual-clutch transmission and a rough schematic of the structure of a pressure accumulator.
Figure 2A:
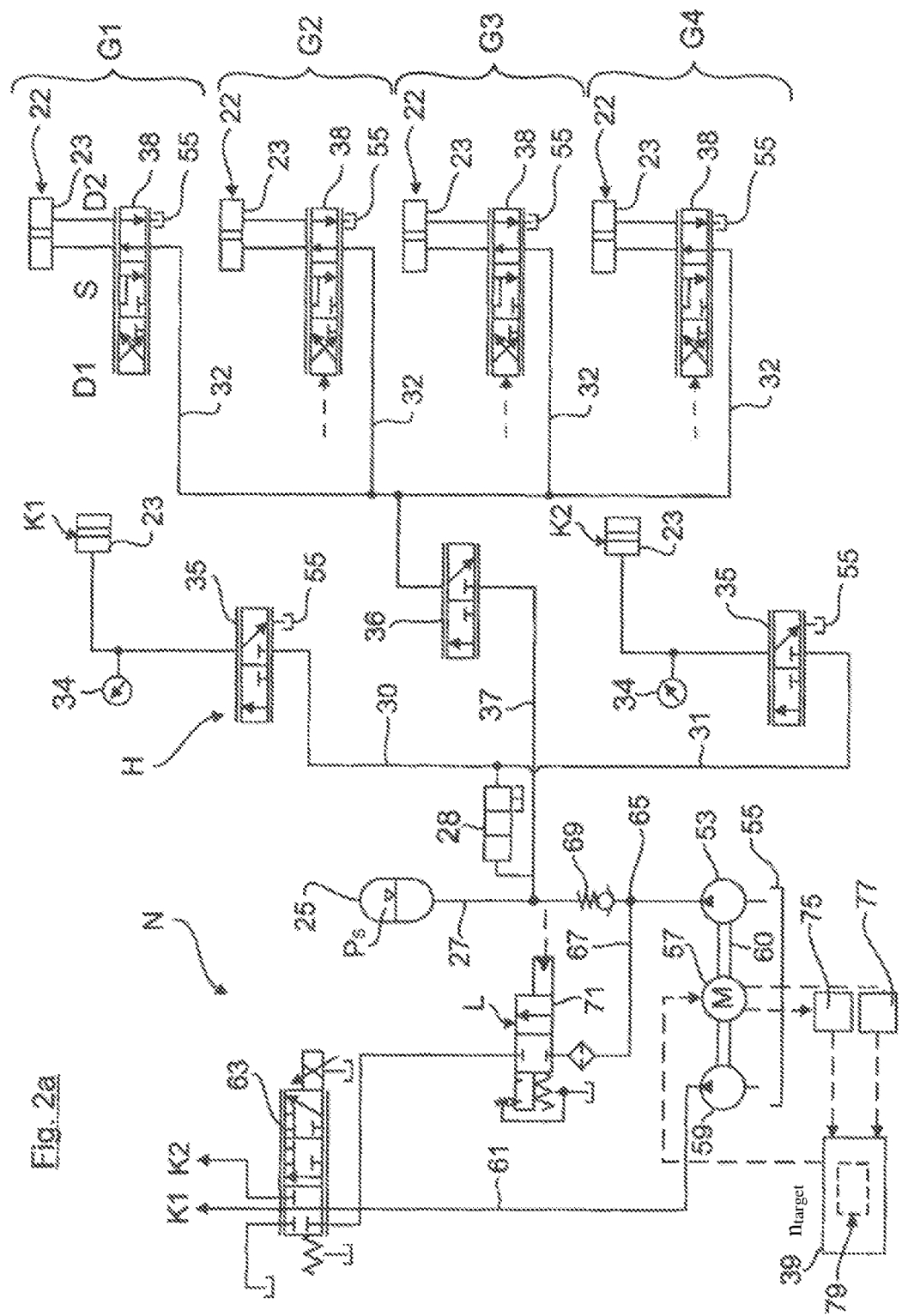
FIG. 2a shows a block diagram of a hydraulic system of a dual-clutch transmission and a rough schematic of the structure of a pressure accumulator.

FIG. 2a shows the hydraulic system of the dual-clutch transmission in a highly simplified block diagram. The hydraulic cylinders 22, 23 of the clutches K1, K2 and of the gear selectors are actuated by means of the hydraulic system. The hydraulic system of FIG. 2a has a high-pressure circuit H and a low-pressure circuit N. In the high-pressure circuit H, the hydraulic cylinders 22, 23 of the clutches K1, K2 and of the gear selectors, connected therein, can be pressurized via a pressure accumulator 25 with an accumulator pressure $p_S$, which may be in the range of about 30 bar, for example. For this purpose, a main line 27 connected to the pressure accumulator 25 leads along clutch paths 30, 31 to the clutch hydraulic cylinders 23 and along gear selector paths 32 to the gear selector hydraulic cylinders 22. Clutch valves or gear selector valves 35, 38 are positioned in each of the gear selector paths and clutch paths 30, 31, 32. The clutch valves or gear selector valves 35, 38 are controllable in a manner not shown via a central control unit 39. In addition, the control unit 39 is in signal communication with pressure sensors 34. The pressure sensors 34 detect the hydraulic pressure applied to the first clutch K1 and to the second clutch K2.

The hydraulic system further comprises a charge pump 53, which is connected on the input side to an oil sump 55. The charge pump 53 can be activated by the control unit 39, via an electric motor 57, to charge the pressure accumulator 25. In addition, the charge pump 53 is arranged together with a cooling pump 59 on a common drive shaft 60, which is driven by the electric motor 57. The cooling pump 59 is connected on its output side to a low-pressure line 61, which leads to a distribution valve 63. When a requirement for cooling exists, the hydraulic fluid can be conducted to the first and/or to the second clutch K1, K2 and subsequently back into the oil sump 55, dependent upon the position of the distribution valve 63.

In FIG. 2a, the main line 27 of the high-pressure circuit H branches off at a branching-off point 65 into a bypass line 67, which is connected to the low-pressure line 61 of the low-pressure circuit N. Downstream of the branching-off point 65, a check valve 69 is positioned, which will be described later. Also integrated into the bypass line 67 is an accumulator charging valve 71. The accumulator charging valve 71 can be adjusted between the charging position L shown in FIG. 2a and a cooling position K, depending upon the level of the accumulator pressure $p_S$ in the high-pressure circuit H.

The accumulator pressure $p_S$ in the high-pressure circuit H acts as a control pressure, with which the accumulator charging valve 71 can be adjusted without additional external energy, i.e. automatically. The accumulator charging valve 71 is designed to move into the charging position L, for example when the accumulator pressure $p_S$ in the high-pressure circuit H falls below a lower threshold value, for example 25 bar. In addition, the accumulator charging valve 71 is automatically shifted into its cooling position K when the accumulator pressure $p_S$ exceeds an upper threshold value $p_{max}$, for example 28 bar.

Figure 11:
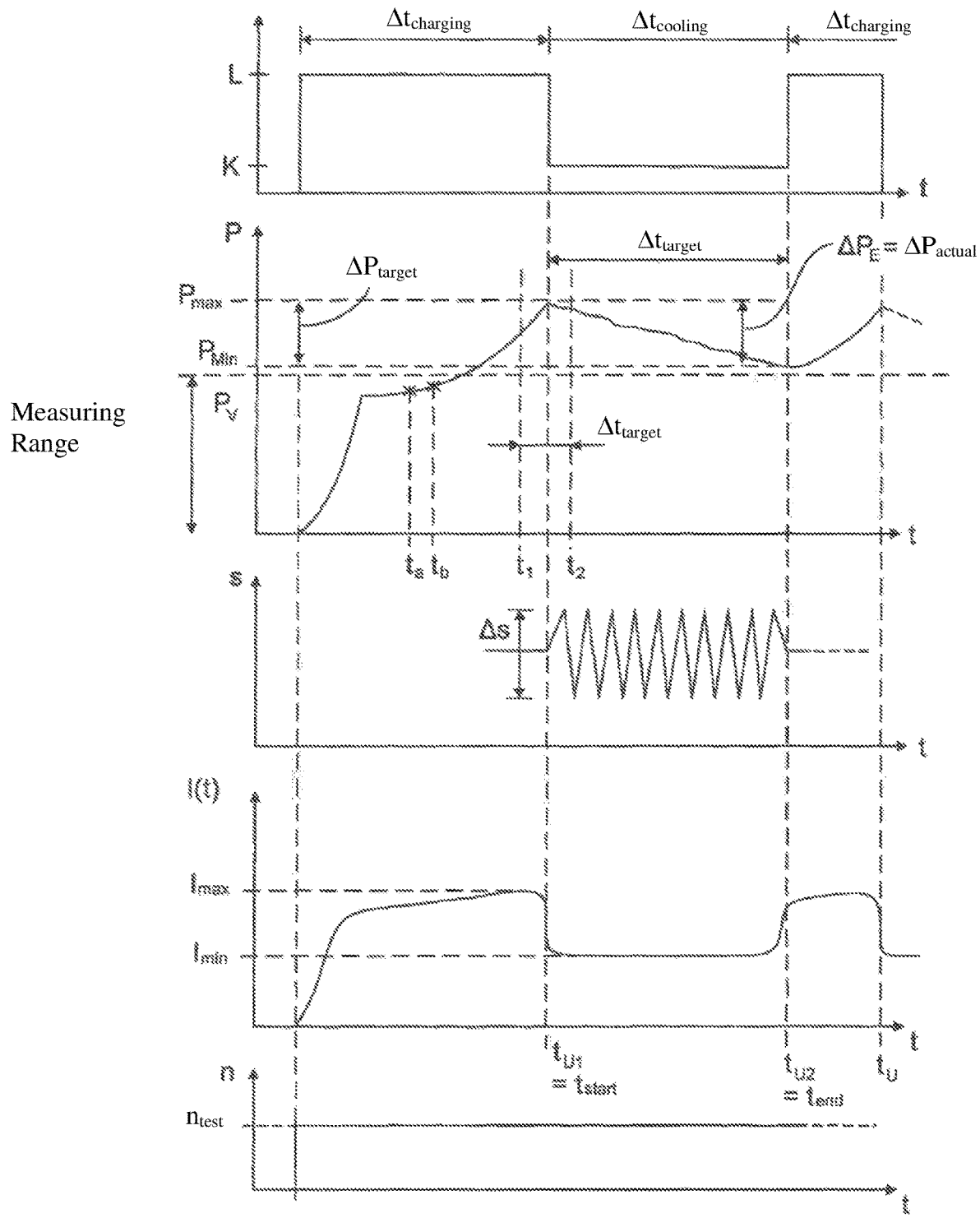
FIG. 11 contains graphs illustrating the profiles over time during switchover timing diagnosis and during valve spread diagnosis.

During driving operation, actuations of the clutches K1, K2 and of the gear selectors G1 to G4 result in pressure losses. In addition, further pressure losses occur due to basic leakage in the high-pressure circuit H, i.e. due to leakage resulting from valve gaps or the like. As a result, the accumulator pressure $p_S$ is reduced during driving operation. If the accumulator pressure $p_S$ should fall below the lower threshold value $p_{min}$ (i.e., if a requirement to charge the pressure accumulator exists), the accumulator charging valve 71 will automatically move to its charging position L (FIG. 2). Upon detection of the requirement to charge the pressure accumulator, the control unit 39 will activate the electric motor 57 to a target charging speed. This enables the hydraulic charge pump 53 to charge the pressure accumulator 25. In such a charging operation, the hydraulic charge pump 53 operates under a high pump load and therefore at a correspondingly high actual current consumption $I_{max}$ (FIG. 11). When the accumulator pressure $p_S$ exceeds the upper threshold value $p_{max}$ (FIG. 11), i.e. when a requirement to charge the pressure accumulator no longer exists, the accumulator charging valve 71 automatically moves into its cooling position K. In the cooling position K, the hydraulic charge pump 53 delivers hydraulic oil via the now opened bypass line 67 into the low-pressure circuit N. At the same time, the high-pressure circuit H is closed in a pressure-tight manner via the check valve 69. Accordingly, the hydraulic charge pump 53 is no longer operating at a high pump load, but at a reduced pump load and also at a correspondingly reduced actual current consumption $I_{min}$ (FIG. 11).

As mentioned above, upon detection of a requirement to charge the pressure accumulator, the control unit 39 activates the electric motor 57 to a target charging speed. For detecting such a requirement to charge the pressure accumulator, a pressure sensor in the high pressure circuit H and a position sensor in the accumulator charging valve 71 are dispensed with according to the invention. Instead, the control unit 39 is equipped with an analysis unit. The analysis unit is in signal communication with a current measuring device 75, which is integrated into control of the motor and which detects the actual current consumption $I_{actual}$ of the electric motor 57, and with a speed sensor 77, which detects the actual rotational speed $n_{actual}$ of the electric motor 57.

FIG. 2b illustrates the basic structure and the functioning of the pressure accumulator 25. According to said figure, the pressure accumulator 25 is a piston-cylinder unit having an oil chamber 26, which is connected to the hydraulic lines 27, 31, 32, and a preloaded pressure piston 27. Preloading is achieved in this example by means of gas pressure applied to the pressure piston 27. Alternatively, preloading may be achieved by means of a spring. When the oil chamber 26 is completely drained, the pressure piston 27 (indicated in FIG. 2b by a dashed line) is pushed with a preload force $F_V$ against a stop 29 of the pressure accumulator 25. This means that during a filling operation, a hydraulic pressure which is greater than a preload pressure $p_V$ that correlates to the preload force $F_V$ prevails, to overcome the preload force $F_V$.

In FIG. 2b, the pressure accumulator 25 is shown in a partially filled state, in which the hydraulic oil is acting on the pressure piston 27 with an accumulator pressure, thereby building up the preload force $F_V$. In the completely drained state, the hydraulic lines 27, 31 are not pressurized by the pressure accumulator 25. Rather, ambient pressure $P_U$ prevails in the hydraulic lines 27, 31, 32. The automatic transmission is ready for operation when all the hydraulic lines 27, 31, 32 are filled with hydraulic oil and when the hydraulic pressure in the hydraulic lines 27, 31, 32 is greater than the preload pressure $p_V$, specifically by a preset pressure difference, so that the state of operational readiness will not be lost again due to basic leakage as soon as the charge pump 53 is switched off.

In FIG. 2a, the control unit 39 includes a diagnostic module 79 with which the charging behavior can be checked, more particularly, conditions can be checked to determine whether the actual preload pressure $p_V$ in the pressure accumulator 21 matches a reference preload pressure $pV_{Ref}$ indicated in the specification (i.e. structurally specified). The program blocks required for this are outlined in FIG. 3. According to said figure, the diagnostic module 79 has an analysis unit 80, which compares a temperature-dependent preload pressure $p_{VRef}$ stored in a characteristic map 83 with an actual accumulator pressure $p_S(t_V)$ (FIG. 4), which will be described later. The actual accumulator pressure $p_S(t_V)$ is detected by the pressure sensor 34 at a preload pressure time $t_V$, which will be described later. During the diagnostic operation, the clutch valve 35 in one of the clutch paths 30, 31 is constantly open, while the clutch valve 35 in the other clutch path is closed.

If the pressure accumulator is functioning properly, the actual accumulator pressure $p_S(t_V)$ detected at the preload pressure time $t_V$ will match the reference preload pressure $p_{VRef}$. In contrast, if a significant preload pressure deviation exists, the analysis unit 80 will identify this as a preload pressure fault, which will be stored in a preload pressure fault memory 81 (FIG. 3). If it is determined that the pressure accumulator 25 is functioning properly, a further analysis unit 82 (FIG. 4) of the diagnostic module 79 will perform a clutch path diagnosis, which will be described later.

In the following, the pressure accumulator diagnosis (i.e., preload pressure diagnosis) and the clutch path diagnosis will be described in reference to FIGS. 3 and 4: To prepare for pressure accumulator diagnosis, the oil chamber 26 of the pressure accumulator 25 is drained completely and the actual accumulator pressure $p_S(t)$ in the hydraulic system is reduced to an ambient pressure $p_U$ so that the pressure accumulator diagnosis can begin at a diagnosis start time $t_S$ (FIG. 4). The above-described condition for the start of diagnosis is achieved by actuating the hydraulic cylinders 22, 23 of the clutches K1, K2 and the gear selectors G1 to G4, as indicated in the graph illustrating travel distance at the top of FIG. 4. Accordingly, the hydraulic cylinders 22, 23 are activated intermittently by supplying power to the respective clutch valves or gear selector valves 35, 38 until, due to the removal of hydraulic fluid associated with the hydraulic cylinder actuation, the accumulator pressure $p_S$ detected by the pressure sensor 34 is reduced to the ambient pressure $p_U$. The existence of such an ambient pressure $p_U$ can be detected by the pressure sensor 34. Alternatively, position sensors 93 in the hydraulic cylinders 22, 23 may be used to determine whether or not the respective hydraulic cylinder 22, 23 is still traveling a travel distance s (FIG. 4). If not, it will be concluded that an ambient pressure $p_U$ exists in the hydraulic system.

Diagnostic charging operation, in which the hydraulic charge pump 53 is operated at a constant charging speed $n_L$ (FIG. 4, lower graph), then begins at time $t_S$ (FIG. 4). First, for example, the pressure sensor 34 located in the first clutch path 31 detects the actual accumulator pressure profile $p_S(t)$, as represented in the middle graph in FIG. 4. As illustrated by said graph, the accumulator pressure $p_S$ increases until the preload pressure time $t_V$ at which the actual accumulator pressure $p_S(t_V)$ detected by the pressure sensor 34 has reached the pressure accumulator preload pressure $p_V$.

As was stated above, if the pressure accumulator is functioning properly, the actual accumulator pressure $p_S(t_V)$ detected at the preload pressure time $t_V$ (accounting for temperature dependencies) will be identical to a reference preload pressure $p_{VRef}$. If the actual accumulator pressure $p_S(t_V)$ detected at the preload pressure time $t_V$ is found to deviate significantly from the reference preload pressure $p_V$ Ref, the analysis unit 80 will diagnose a preload pressure fault. As diagnostic charging operation continues, after the preload pressure time $t_V$, the oil chamber 26 of the pressure accumulator 25 is filled, specifically by displacement of the pressure piston 27.

As is clear from the middle graph of FIG. 4, during diagnostic charging operation the actual accumulator pressure profile $p_S(t)$ rises with a steep pressure gradient $\dot{p}_1$ until the preload pressure $p_V$ is reached in the pressure accumulator 25 (i.e. up to the preload pressure time $t_V$). Afterward (i.e. after the preload pressure time $t_V$), in contrast, the actual accumulator pressure profile $p_S(t)$ rises with only a shallower pressure gradient $\dot{p}_2$. This characteristic charging curve for the pressure accumulator 25 is used as follows to determine the preload pressure time $t_2$: The analysis unit 80 detects the pressure gradients $\dot{p}_1$, $\dot{p}_2$ of the actual accumulator pressure profile $p_S(t)$. When a significant gradient change between the pressure gradients $\dot{p}_1$ and $\dot{p}_2$ is detected, the analysis unit 80 identifies this as the preload pressure time $t_V$.

If no preload pressure fault is detected in the above preload pressure diagnosis, this will be followed immediately by the clutch path diagnosis: For this purpose, the diagnostic charging operation carried out during the pressure accumulator diagnosis is simply continued until the pressure sensor 34 reaches an upper threshold value $p_{max}$. (FIG. 4, middle graph). In the middle graph of FIG. 4, the upper threshold value $p_{max}$ lies above the preload pressure $p_V$ of the pressure accumulator 25 by a pressure difference $\Delta p$. When the diagnostic charging operation is completed, a second analysis unit 82 compares a pressure gradient $\dot{p}_3$ of the actual accumulator pressure profile $p_S(t)$ with a reference pressure gradient $\dot{p}_{Ref}$, which is stored on a temperature-dependent basis in a characteristic map 84 (FIG. 3) in the diagnostic module 79. Based upon this comparison, the analysis unit 82 determines whether a fault-free or a faulty leakage-induced pressure decrease is present in the actual accumulator pressure profile $p_S(t)$.

It should be emphasized that the clutch path diagnosis is performed only if the analysis unit 80 does not detect a preload pressure fault. If the pressure accumulator 25 is fault-free, any faulty leakages can be unambiguously assigned to the clutch path 31. Both during the pressure accumulator diagnosis and during the clutch path diagnosis, the pressure control valve 36 located in the connecting line 37, which connects the main line 27 to the gear selector paths 32, is closed.

To validate the results obtained in the preload pressure/clutch path diagnosis, the diagnostic operation described above in reference to the first clutch path 31 can be performed twice, specifically as part of a first partial diagnosis A using the pressure sensor 34 located in the first clutch path 31 and with the clutch valve 35 in the second clutch path 32 closed. The above diagnostic operation can then be performed as part of a second partial diagnosis B, specifically with the pressure sensor 34 located in the second clutch path 30 and with the clutch valve 35 in the first clutch path 31 closed.

If the same fault is detected in both the first partial diagnosis A and the second partial diagnosis B, the diagnostic module 79 can diagnose a pressure accumulator fault and can rule out a clutch path fault with high probability. If different fault results are obtained, the diagnostic module 79 can diagnose a leakage fault in one of the two clutch paths 30, 31.

FIG. 5 is a highly simplified block diagram showing the program blocks of the diagnostic module 79 that are required for a gear selector path diagnosis. The gear selector path diagnosis is performed as a follow-on diagnosis immediately following the clutch path diagnosis (FIG. 3) under the condition that at least one clutch path 30, 31 is diagnosed as having fault-free leakage during the clutch path diagnosis. The pressure sensor 34 of the clutch path 30, 31 that is classified as fault-free (hereinafter referred to as the reference clutch path) is used for the gear selector path diagnosis illustrated in FIGS. 5 and 6.

As is clear from FIG. 5, the diagnostic module 79 has a third analysis unit 85, at the signal input of which an actual accumulator pressure $p_S(t)$ detected by the pressure sensor 34 and an actual accumulator pressure gradient p are applied. The analysis unit 85 checks the leakage behavior of each of the gear selector paths 32 separately. Any leakage faults that are detected are stored in the fault memory 87.

In the following, the gear selector path diagnosis will be described in reference to FIGS. 5 and 6: The diagnostic module 79 begins by opening the clutch valve 35 located in the reference clutch path 30, in order to detect the actual accumulator pressure profile $p_S(t)$. The pressure control valve 36 in the connecting line 37 of the hydraulic system is also opened, to establish a pressure connection between the pressure sensor 34 located in the reference clutch path 30 and the gear selector paths 32. A diagnostic charging operation is then performed by activating the hydraulic charge pump 53. During the diagnostic charging operation, the actual accumulator pressure $p_S(t)$ is increased up to the upper threshold value $p_{max}$ (FIG. 6) at the end time $t_{off}$. When the diagnostic charging operation has ended, i.e. at the end time $t_{off}$ (FIG. 6), the pressure sensor 34 detects a pressure gradient $\dot{p}_{K+G}$ of the accumulator pressure profile $p_S(t)$ during a measurement time interval $\Delta t_M$. The analysis unit 85 compares the pressure gradient $\dot{p}_{K+G}$ with a reference pressure gradient $p_{Ref}$ and analyzes whether a fault-free or a faulty pressure decrease (i.e. a gear selector leak) is present in the accumulator pressure profile $p_S(t)$.

As shown in FIG. 2a, each of the gear selector valves 35 located in the gear selector paths 32 can be adjusted between a closed valve position S and two flow-through valve positions D1, D2. The gear selector path diagnosis is performed for each of the flow-through valve positions D1 and D2 separately in the gear selector path 32 to be tested. This means that in each gear selector path 32, the gear selector path diagnosis is carried out both with the gear selector valve 38 in the first flow-through valve position D1 and with the gear selector valve 38 in the second flow-through valve position D2. In contrast, the gear selector valves 38 in the remaining gear selector paths 32 remain switched to the closed valve position S, in order to increase measuring accuracy in the diagnosis of the gear selector path 32 being tested. The pressure gradient $\dot{p}_{K+G}$ detected in the measurement time interval $\Delta t_M$ by the pressure sensor 34 therefore reflects the collective pressure decrease both in the reference clutch path 30 and in the gear selector path 32 being tested, the gear selector valve 38 of which is switched to one of the two flow-through positions D1, D2.

The reference pressure gradient $p_{Ref}$ is read out from a characteristic map database, e.g. from the characteristic map database 83 already shown in FIG. 3. In this case, the readable reference pressure gradient $p_{Ref}$ would correspond to a fault-free basic leakage of the reference clutch path 30. In the analysis unit 85, in addition to the detection of the pressure gradients $p_{K+G}$, absolute pressure values are also detected, i.e. the actual accumulator pressure $p_S$ ($t_{start}$) at the start time $t_{Start}$, and the actual accumulator pressure $p_S$ ($t_{End}$) at the measurement end time $t_{End}$ of the measurement, time interval $\Delta t_M$. In this case, if the conditions are met that, first, there is a sufficiently large accumulator pressure difference between the start time $t_{Start}$ and the end time $t_{End}$, and second, the pressure gradient $\dot{p}_{K+G}$ is equal to the reference pressure gradient $\dot{p}_{Ref}$, the analysis unit 85 will diagnose a fault-free gear selector path 32.

Figure 7:
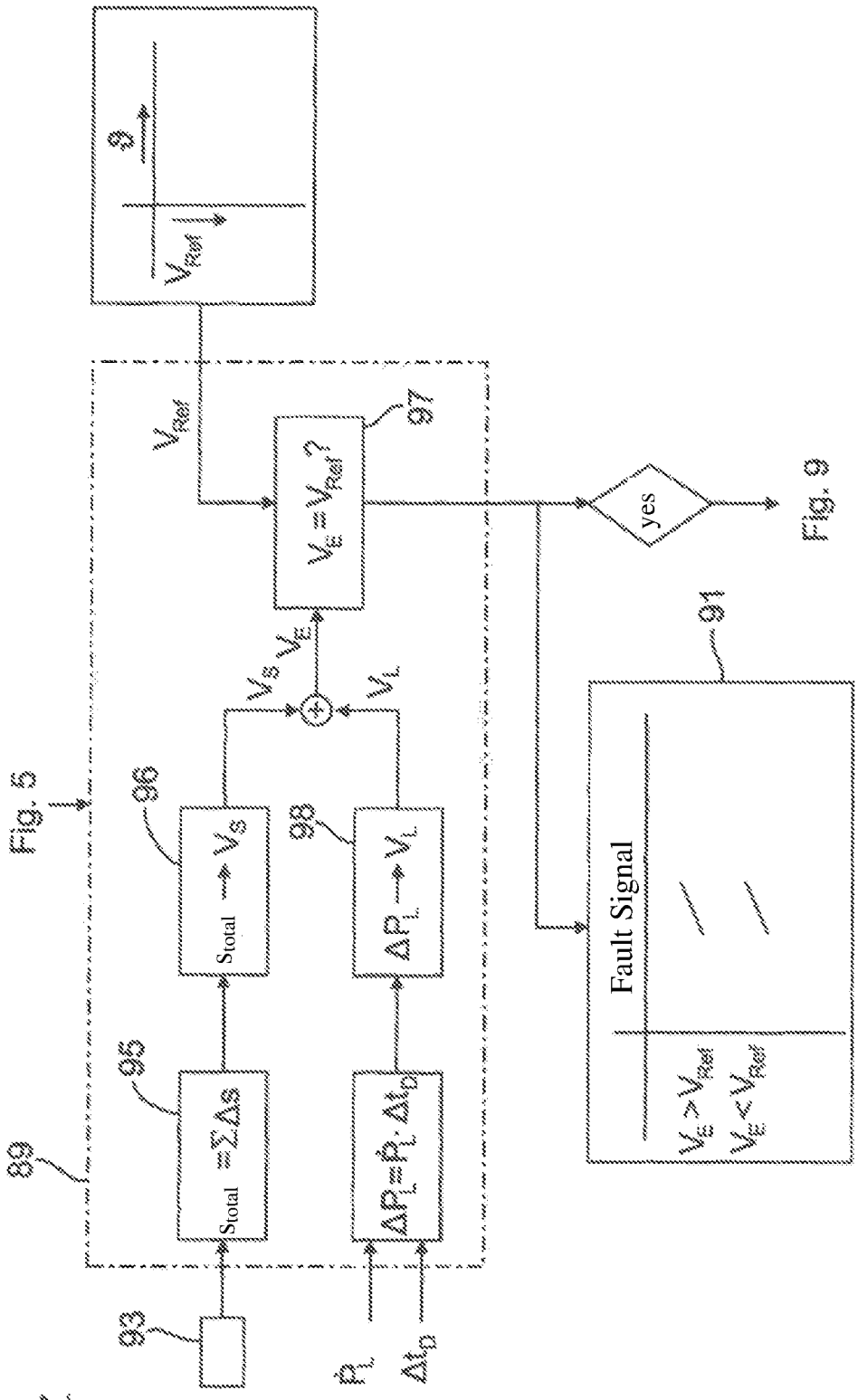
FIG. 7 is a block diagram showing the program blocks required for accumulator volume diagnosis in the diagnostic module.

FIG. 7 is a highly simplified block diagram showing the program blocks of the diagnostic module 79 that are required for an accumulator volume diagnosis. The accumulator volume diagnosis is performed as a follow-on diagnosis immediately following the gear selector path diagnosis (FIGS. 5 and 6), under the condition that in the gear selector path diagnosis, at least one gear selector path 32 of gear selectors G1 to G4 has been diagnosed as fault-free and can thus be used as a reference gear selector path in the accumulator volume diagnosis.

As is clear from FIG. 7, the diagnostic module 79 has an analysis unit 89 which, in a comparator block 97, compares a hydraulic fluid removal $V_E$ determined during the accumulator volume diagnosis with a reference accumulator volume $V_{ref}$. If a significant deviation is found, an accumulator volume fault is diagnosed, which is stored in the fault memory 91. The reference accumulator volume $V_{ref}$ can be read out from an accumulator volume characteristic map in a database, in which the reference values are stored on a temperature-dependent basis.

As is further clear from FIG. 7, the analysis unit 89 is in signal communication with a position sensor 93 of the gear selector hydraulic cylinder 22 located in the reference gear selector path 32. During the accumulator volume diagnosis, the gear selector valve 38 in the reference gear selector path 32 is actuated, and the position sensor 93 detects the travel distances $\Delta_S$ of the gear selector hydraulic cylinder 22. These are integrated in a travel distance integrator 95 to obtain a total travel distance $s_{total}$. In a converter block 96, the total travel distance $s_{total}$ is converted to a total displacement volume $V_S$. To the total displacement volume $V_S$, a hydraulic fluid leakage volume $V_L$ that flows out during the accumulator volume diagnosis is added. The resulting hydraulic fluid removal $V_E$ is forwarded to the aforementioned comparator block 97.

Figure 8:
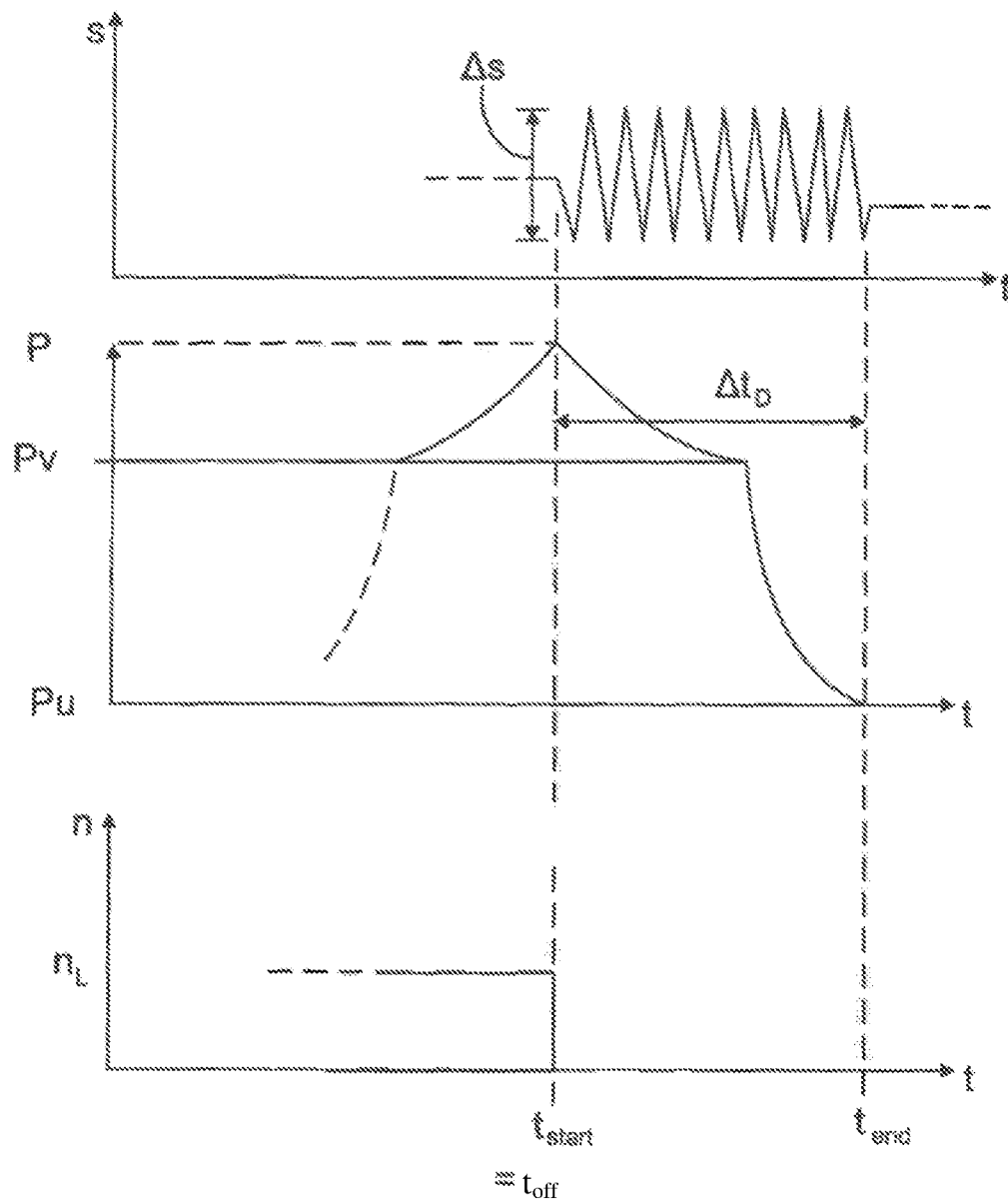
FIG. 8 contains graphs illustrating the accumulator volume diagnosis.

The accumulator volume diagnosis is performed as follows: First, the pressure accumulator 25 is filled completely with hydraulic fluid in a diagnostic charging operation. The diagnosis charging operation is a blind charging procedure which takes place in a defined time t. The reference hydraulic cylinder 22 is then actuated intermittently within a diagnosis time interval $\Delta t_D$, beginning at a start time $t_{start}$ (which in FIG. 8 coincides with the switch-off time $t_{off}$) and continuing until, as a result of the leakage volume $V_L$ and the displacement volume $V_S$ removed from the hydraulic system, an ambient pressure $p_U$ is present in the hydraulic system. Rather than being measured via a pressure sensor, the ambient pressure $p_U$ is detected indirectly in the diagnostic module 79, specifically at the end time $t_{end}$ (FIG. 8) of the diagnosis time interval $\Delta t_D$, when, despite the flow-through valve position D1, D2 of the reference control valve 35, the position sensor 93 no longer detects any further travel distance $\Delta_S$.

During the pressure accumulator volume diagnosis, one of the clutch paths 30, 31 as the reference clutch path, along with the reference gear selector path 32 that leads to the reference hydraulic cylinder 22, is pressurized with the accumulator pressure $p_S$ prevailing in the hydraulic system. In contrast, the hydraulic cylinders 22 of the other gear selector paths 32 and of the other clutch path are decoupled from the accumulator pressure $p_S$.

The leakage volume $V_L$ can be determined based upon the pressure gradients in the clutch path 30 and at the reference gear selector 22, detected during the preceding diagnoses (e.g. the pressure gradient $\dot{p}_{K+G}$ from the gear selector path diagnosis according to FIGS. 5 and 6). The pressure gradient $\dot{p}_L$ is multiplied in the analysis unit 89 by the diagnosis time interval $\Delta t_D$. The resulting pressure difference $\Delta_{pL}$ is converted in a converter 98 to the leakage volume $V_L$.

Figure 9:
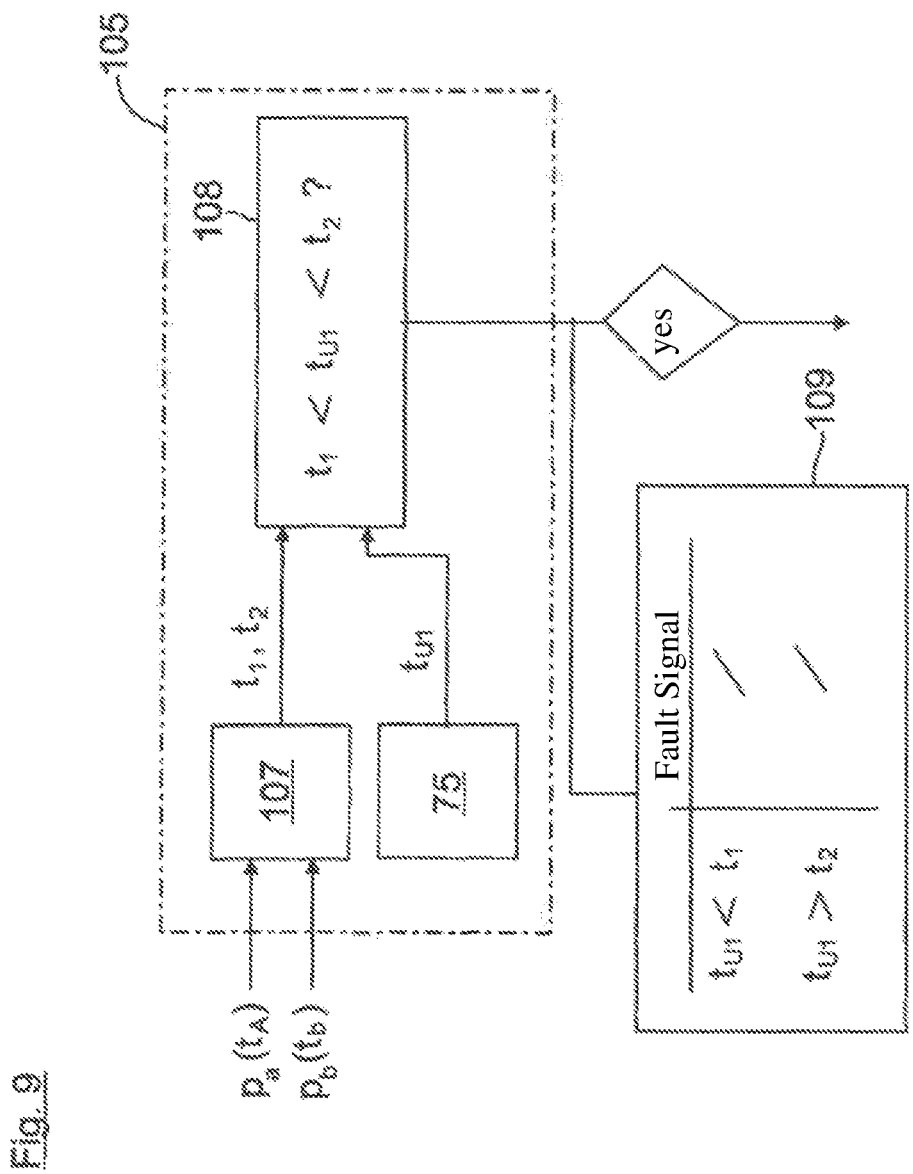
FIG. 9 is a block diagram showing the program blocks required for switchover timing diagnosis in the diagnostic module.

FIG. 9 is a highly simplified block diagram showing the program blocks of the diagnostic module 79 that are required for a switchover point diagnosis of the accumulator charging valve 71. The switchover timing diagnosis is performed as a follow-on diagnosis immediately following the accumulator volume diagnosis (FIGS. 7 and 8), under the condition that a plausible accumulator volume of the pressure accumulator 25 was diagnosed in the accumulator volume diagnosis.

As is clear from FIG. 9, the diagnostic module 79 has an analysis unit 105 with which, as part of the switchover timing diagnosis, a check is made to determine whether a first switchover time $t_{U1}$, at which the accumulator charging valve 71 switches automatically from its charging position L to its non-charging position K, and a second switchover time $t_{U2}$, at which the accumulator charging valve 71 switches automatically from its non-charging position K to its charging position, are plausible. For this purpose, the analysis unit 105 determines whether, at the first switchover time $t_{U1}$, the actual accumulator pressure $p_S(t)$ is within range of the upper pressure threshold value $p_{max}$. In addition, the analysis unit 105 determines whether at the second switchover time $t_{U2}$, the actual accumulator pressure $p_S(t)$ is within range of the lower pressure threshold value $p_{min}$.

For detecting the two switchover times $t_{U1}$ and $t_{U2}$, the current measuring device 75 of the electric motor 57 is used. The current measuring device 75 detects the actual current consumption I(t) of the electric motor 57. In this process, the time of a change from a high current consumption $I_{max}$ to a low current consumption $I_{min}$ is defined by the control unit 39 as the first switchover time $t_{U1}$.

The time of a change from the low current consumption $I_{min}$ to the high current consumption $I_{max}$ is defined as the second switchover time $t_{U2}$.

The clutch path pressure sensor 34 is used to detect the actual accumulator pressure $p_S(t)$. In FIG. 11, the measuring range $\Delta p_{meas}$ of said sensor (FIG. 11) lies outside of, i.e. below the pressure threshold values $p_{max}$ and $p_{min}$. Thus, a detection of the actual accumulator pressure $p_S$ immediately at the two switchover times $t_{U1}$ and $t_{U2}$ is not possible because the actual accumulator pressure at the two switchover times lies outside of the measuring range $\Delta p_{meas}$.

In FIG. 9, the actual accumulator pressure $p_S(t)$ is determined at the switchover times $t_{U1}$ and $t_{U2}$ by estimation, specifically with the aid of an extrapolation block 107. In the extrapolation block 107, based upon measured pressure values $p_a(t_a)$ and $p_b(t_b)$ in the accumulator pressure profile that are within the pressure sensor measuring range ($\Delta p_{meas}$), a time frame $\Delta t_{target}$ is estimated. If the accumulator charging valve is operating properly, the first switchover time $t_{U1}$ will lie within the time frame $\Delta t_{target}$. In FIGS. 9 and 11, the time frame $\Delta t_{target}$ is bounded by the two times $t_1$ and $t_2$. In the subsequent comparator block 108 it is determined whether the first switchover time $t_{U1}$ lies within or outside of the time frame $\Delta t_{target}$. If the first switchover time $t_{U1}$ lies outside of the time frame $\Delta t_{target}$, a fault will be diagnosed, which will be stored in the fault memory 109.

FIG. 9 shows only a partial diagnosis in the program blocks, in which a check is made to determine whether or not the first switchover time $t_{U1}$ lies within the time frame $\Delta t_{target}$. In the same manner, the analysis unit 105 checks to determine whether or not the second switchover time $t_{U2}$ lies within an estimated time frame.

Figure 10:
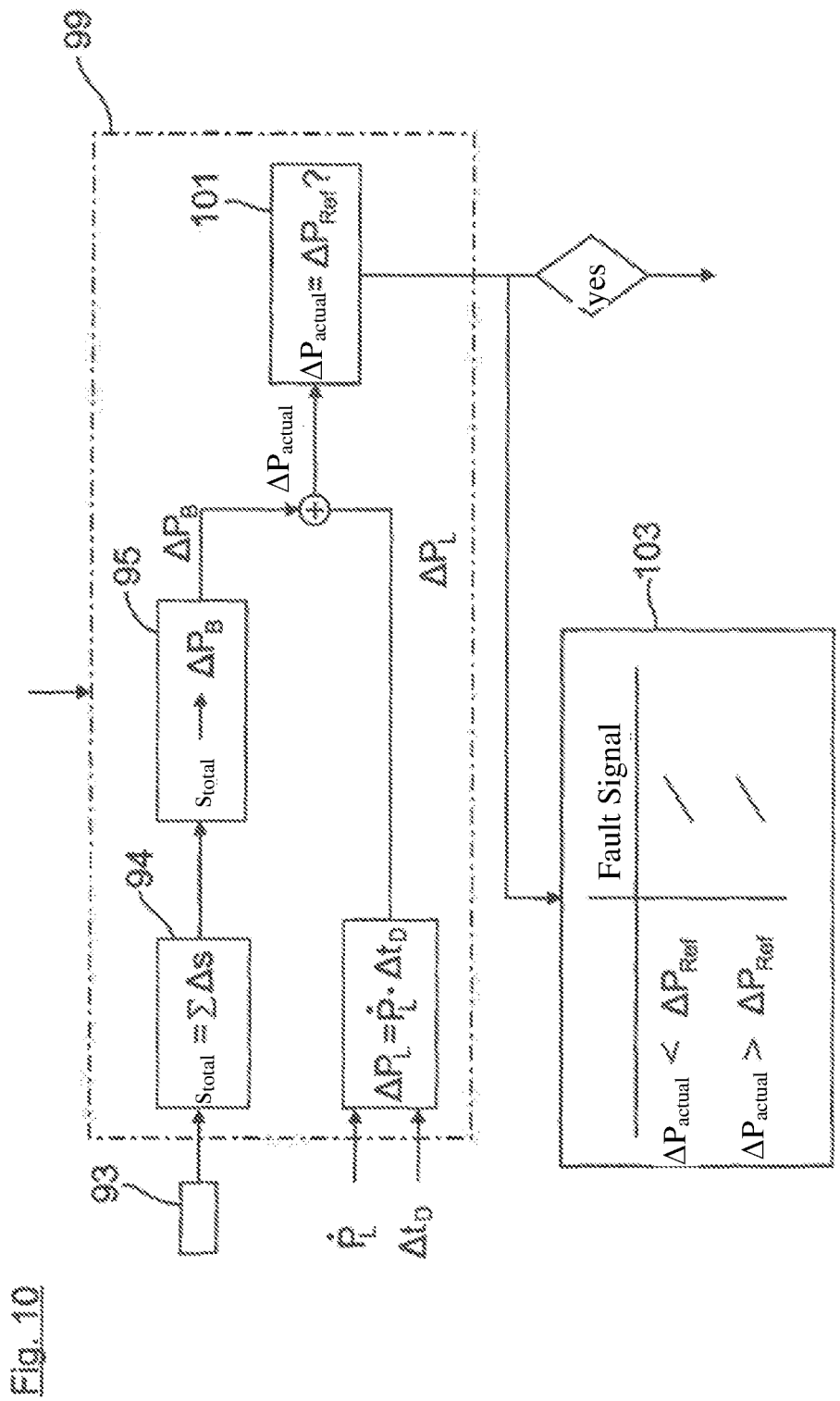
FIG. 10 is a block diagram showing the program blocks required for valve spread diagnosis in the diagnostic module.

FIG. 10 is a highly simplified block diagram showing the program blocks of the diagnostic module 79 that are required for a valve spread diagnosis. The valve spread diagnosis is performed as a follow-on diagnosis immediately following the switchover timing diagnosis (FIG. 9) under the condition that at least one plausible switchover time $t_{U1}$ of the charging accumulator valve 71 has been identified in the switchover timing diagnosis.

In FIG. 10, the diagnostic module 79 has an analysis unit 99 which, in a valve spread diagnosis, determines the actual valve spread $\Delta p_{actual}$ between the lower pressure threshold value $p_{min}$ and the upper pressure threshold value $p_{max}$. A comparator block 101 of the analysis unit 99 compares the actual valve spread $\Delta p_{actual}$ with a target valve spread $\Delta p_{Ref}$. If a significant deviation is found, a fault is diagnosed and is stored in the fault memory 103.

To determine the actual valve spread $\Delta p_{actual}$, the analysis unit 99 defines a diagnosis time interval $\Delta t_D$. The diagnosis time interval $\Delta t_D$ begins at the first switchover time $t_{U1}$ and ends at the subsequent second switchover time $t_{U2}$. Within the above-defined diagnosis time interval $\Delta t_D$, the diagnostic module 79 activates a reference hydraulic cylinder 22, which according to FIG. 11 is switched back and forth constantly, i.e. intermittently, during the diagnosis time interval $\Delta t_D$. Due to the actuation of the reference hydraulic cylinder 22 and due to a system-inherent hydraulic system leakage, an accumulator pressure decrease $\Delta p_E$ that corresponds to the actual valve spread $\Delta p_{actual}$ occurs during the diagnosis time interval $\Delta t_D$.

The accumulator pressure decrease $\Delta p_E$, i.e. the actual valve spread $\Delta p_{actual}$, is determined using the program blocks shown in FIG. 10, as follows: From the position sensor 93, the piston travel distances $\Delta s$ are integrated in an integrator 94 during the diagnosis time interval $\Delta t_D$ to obtain a total travel distance $s_{total}$. This is then used in a converter block 95 to calculate the pressure decrease $\Delta p_B$ associated with the gear selector actuation. The pressure decrease $\Delta p_B$ associated with the gear selector actuation is added in a summation element to the leakage-induced pressure decrease $\Delta p_L$, which gives the accumulator pressure decrease $\Delta p_E$ during the diagnosis time interval $\Delta t_D$. The leakage-induced pressure decrease $\Delta p_L$ in the reference hydraulic cylinder 22 has already been determined in previous diagnoses.

As shown in FIG. 2a, connected upstream of the two clutch paths 30, 31 is a safety valve 28 that can be activated by the electronic control unit 39. The safety valve 28 can be actuated between a closed position and a flow-through position. In the closed position, the two clutch paths 30, 31 are pressure-decoupled from the pressure accumulator 25. In the flow-through position, the two clutch paths 30, 31 can be pressurized with the accumulator pressure $p_S$. If the control unit 39 detects a malfunctioning of the clutch valve 35 in at least one of the clutch paths 30, 31, the safety valve 28 can be adjusted to its closed position for safety reasons. During normal driving operation, the safety valve 28 is constantly in its flow-through position.

Figure 12:
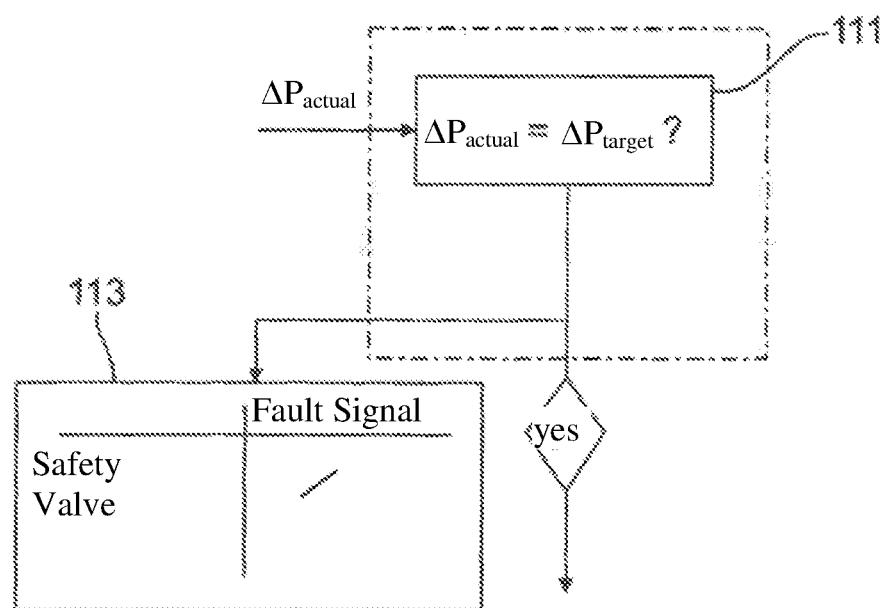
FIG. 12 is a block diagram showing the program blocks required for safety valve diagnosis in the diagnostic module.

FIG. 12 is a simplified block diagram showing the program blocks of the diagnostic module 79 that are required for a safety valve diagnosis. The safety valve diagnosis can be performed independently of other diagnostic steps. During the safety valve diagnosis, the safety valve 28 is switched from the flow-through position to the closed position at a diagnosis start time $t_{start}$ (FIG. 13), thereby creating an actual pressure decrease $\Delta p_{actual}$ downstream of the safety valve 28. The diagnostic module 79 has an analysis unit 111 which compares this actual pressure decrease $\Delta p_{actual}$ with a target pressure decrease $\Delta p_{target}$. If a significant deviation is found, a fault is diagnosed and stored in a safety fault memory 113.

The aforementioned clutch pressure sensor 34 can be used to detect the actual pressure decrease $\Delta p_{actual}$.

In the following, the performance of the safety valve diagnosis will be described in reference to FIGS. 12 and 13: For proper measuring accuracy, the hydraulic pump 53 is activated to a constant speed $n_{test}$ to ensure that there is sufficient accumulator pressure $p_S$ in the high-pressure circuit H, which according to FIG. 13 moves between the upper pressure threshold value $p_{max}$ and the lower pressure threshold value $p_{min}$. The clutch valve 35 of a reference clutch path 30 or 31 is adjusted to its flow-through position prior to the aforementioned start time $t_{Start}$ by a time difference $\Delta t$, so that the pressure sensor 34 between the clutch valve 35 and the clutch hydraulic cylinder 23 can detect the actual pressure decrease $\Delta p_{actual}$. During the time difference $\Delta t$, rather than reading out the hydraulic pressure actually present at the clutch hydraulic cylinder 22 to the analysis unit 111 (FIG. 12), the pressure sensor 34 reads out an upper limiting pressure of the measuring range $\Delta p_{meas}$.

At the diagnosis start time $t_{Start}$, the safety valve 28 is switched from its flow-through position D to its closed position S. The resulting pressure decrease $p_{actual}$ is detected by the pressure sensor 34 and is compared in the analysis unit 111 with the target pressure decrease.

Figure 14:
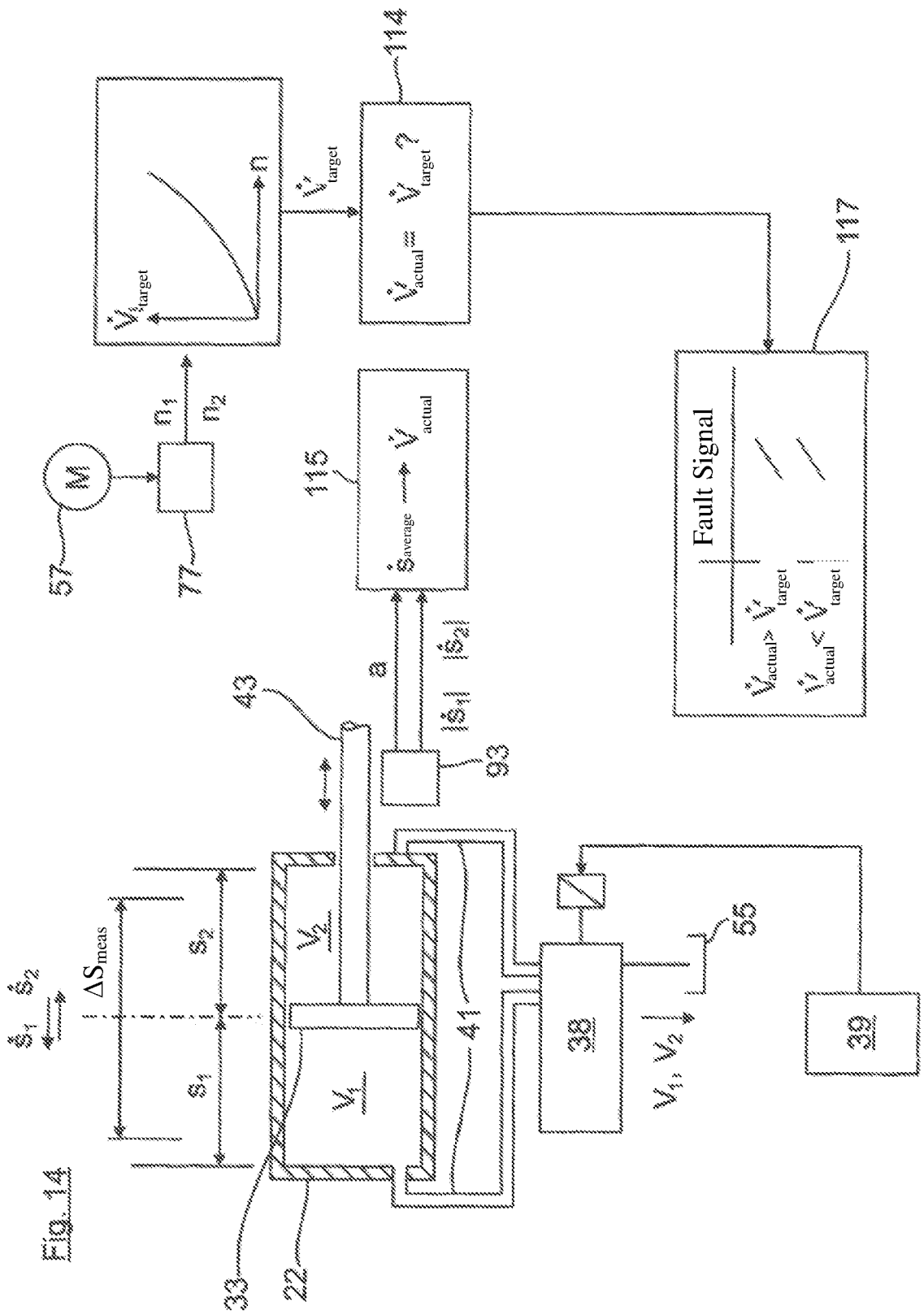
FIG. 14 is a block diagram showing the program blocks required for delivery volume flow diagnosis in the diagnostic module.

FIG. 14 is a highly simplified block diagram showing the program blocks of the diagnostic module 79 that are required for the delivery volume flow diagnosis. The delivery volume flow diagnosis is performed as a follow-on diagnosis immediately following the accumulator volume diagnosis (FIGS. 7 and 8), under the condition that a plausible accumulator volume of the pressure accumulator 25 is detected in the accumulator volume diagnosis.

As is clear from FIG. 14, a gear selector hydraulic cylinder 22, which is connected to the pressure sensor 25 via the gear selector 32, is used for the diagnosis. Upstream of the gear selector hydraulic cylinder 22 is a gear selector valve 38, which can be actuated by the control unit 39 to adjust the hydraulic pressure applied to the gear selector hydraulic cylinder 22. The gear selector valve 38 can be adjusted between two flow-through positions D1, D2 in order to displace a piston 33 in opposing piston strokes over the indicated travel distances $s_1$, $s_2$ and at piston speeds $\dot{s}_1$, $\dot{s}_2$ in the hydraulic actuating cylinder 22. In FIG. 14, the piston 33 divides the hydraulic cylinder into a piston rod-side working chamber and a working chamber opposite the first, the two of which are connected via hydraulic control lines 41 to the gear selector valve 38. A gear selector G1, not shown, can be actuated by means of the piston rod 43 of the gear selector hydraulic cylinder 22. With such a gear selector actuation, the electronic control unit 39 controls the gear selector valve 38 in a known manner into one of the flow-through positions D1, D2, in order to move the piston rod. The piston stroke is associated with a hydraulic fluid removal $V_1$, $V_2$ (displacement volume) from the hydraulic system. Because the internal geometry of the gear selector hydraulic cylinder 22 is known, the respective displacement volume $V_1$, $V_2$ is known. Also provided is a position sensor 93, with which the piston speed $\dot{s}_1$, $\dot{s}_2$ in the respective piston stroke can be detected.

Figure 15:
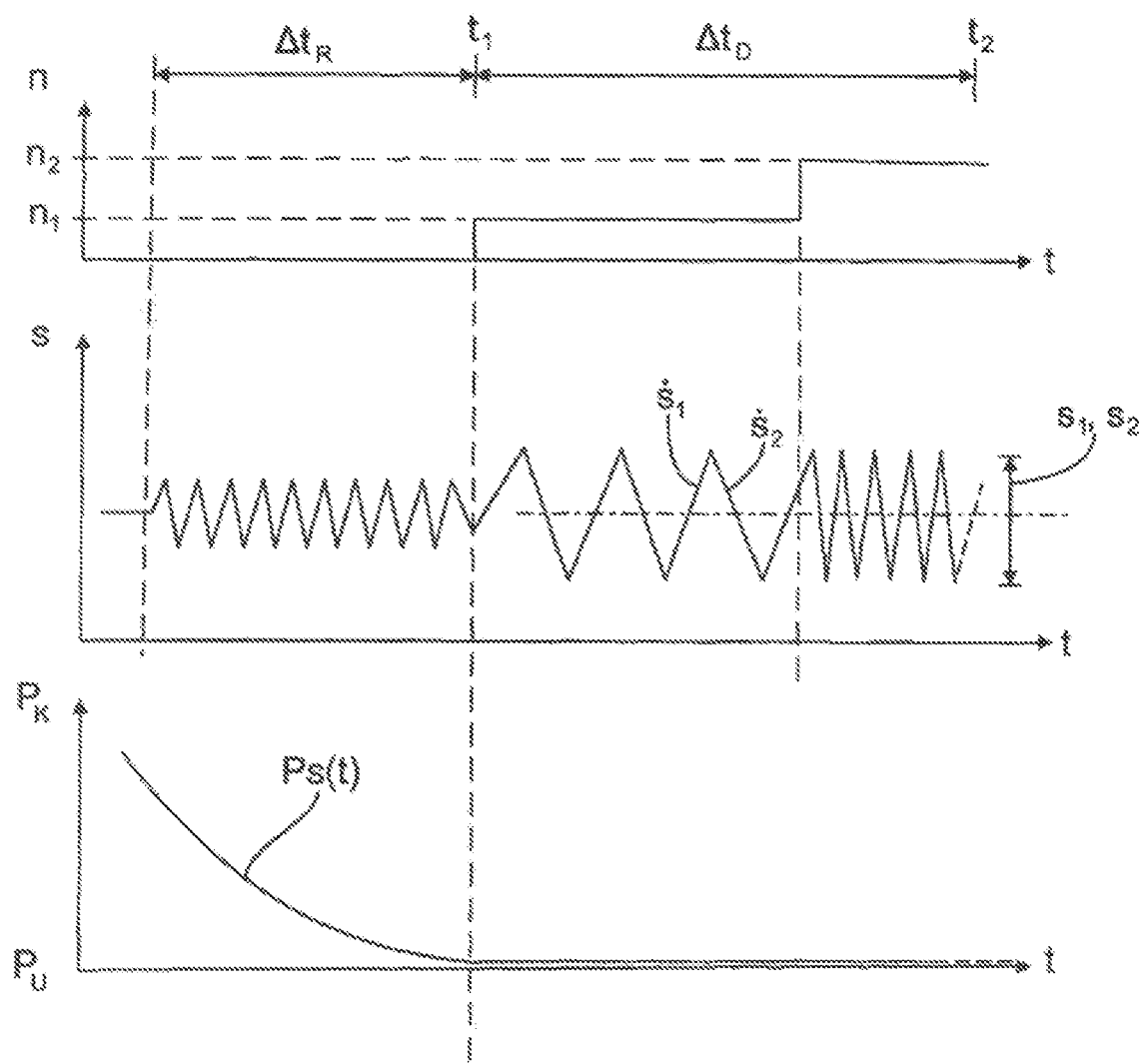
FIG. 15 contains graphs illustrating the profiles over time during delivery volume flow diagnosis.

In the following, the delivery volume flow diagnosis will be described in reference to FIGS. 14 and 15: First, the hydraulic pump 53 is first deactivated within a pressure reduction time interval $\Delta t_R$ (FIG. 15), while at the same time, the gear selector valve 38 is actuated intermittently by the electronic control unit 39, as shown in the middle travel distance graph of FIG. 15. During the pressure reduction time interval $\Delta t_R$, the gear selector valve 38 is actuated so as to move the gear selector hydraulic cylinder 22 back and forth until, as a result of leakage-induced hydraulic fluid removal and as a result of actuation-induced hydraulic fluid removal (i.e., displacements $V_1$, $V_2$), the accumulator pressure $p_S(t)$ is reduced to the ambient pressure $p_U$. In this state, the accumulator 25 has been completely drained. This is followed immediately by the start ($t_{start}$) of a diagnosis time interval $\Delta t_D$. During the diagnosis time interval $\Delta t_D$) a charging operation of the hydraulic pump 53 is carried out, in which the pump is actuated at different test speeds $n_1$ and $n_2$. At the same time, the control valve 35 is adjusted intermittently between its flow-through positions D1, D2. This causes the piston 33 in the gear selector hydraulic cylinder 22 to move back and forth in the gear actuator hydraulic cylinder 22 in opposing piston strokes over piston travel distances $s_1$, $s_2$ and at piston speeds $\dot{s}_1$, $\dot{s}_2$.

The position sensor 93 detects both the individual travel distances $s_1$, $s_2$ per piston stroke and the piston speeds $\dot{s}_1$, $\dot{s}_2$ per piston stroke. In addition, the number a (FIG. 14) of piston strokes during the diagnosis time interval $\Delta t_D$ is detected. These data are forwarded to the signal input of a converter block 115, in which an average piston speed $\dot{s}_{average}$ is calculated from the number a of detected piston strokes. From the average piston speed $\dot{s}_{average}$, an actual delivery volume flow $V_{actual}$ is calculated in the converter block 115. In an analysis unit 113 which is connected in terms of signal communication downstream, the actual delivery volume flow $V_{actual}$ is compared with a target delivery volume flow $V_{target}$, factoring in the respective test speed $n_1$ and $n_2$ during the diagnosis time interval $\Delta t_D$. If a significant deviation is detected in the analysis unit 113, a fault is detected, which is stored in the fault memory 117.

Figure 16:
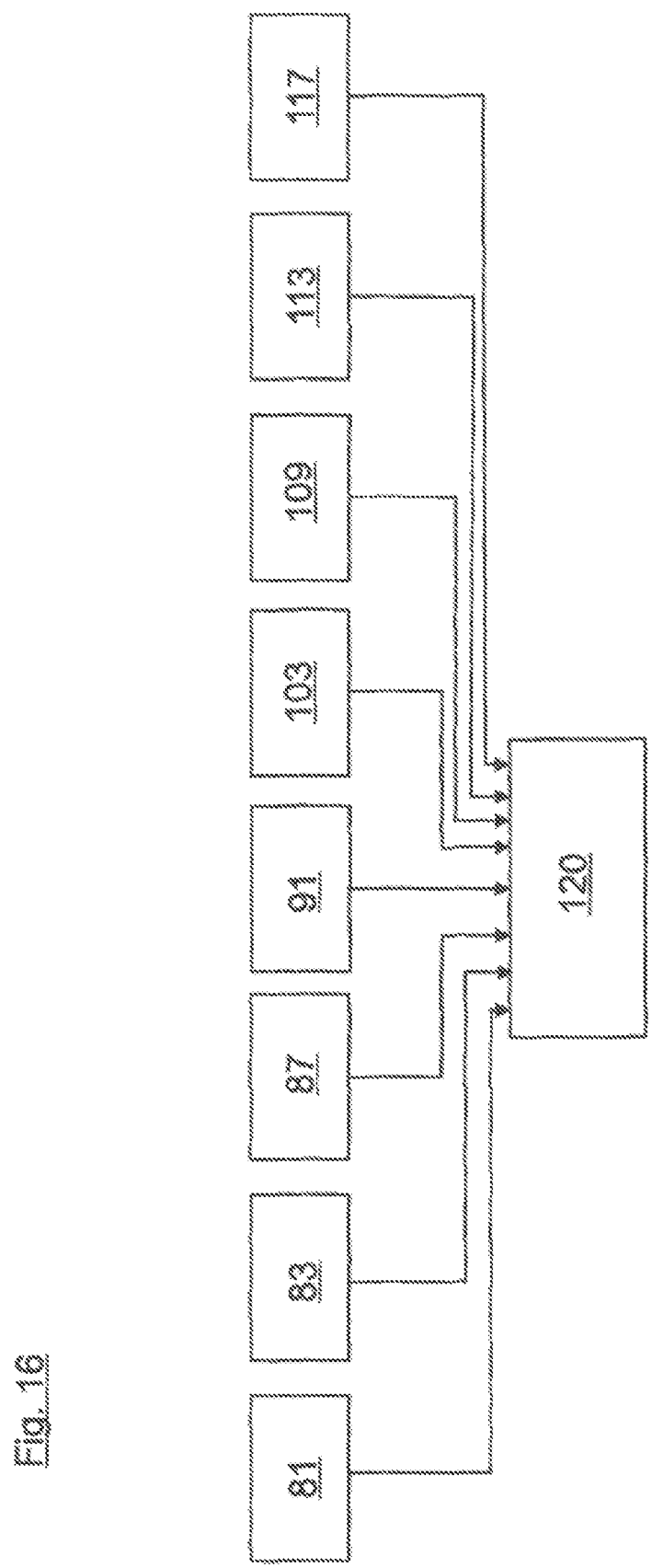
FIG. 16 shows an analysis unit into which the fault signals generated in the fault memories can be read.

As is clear from FIG. 16, all of the fault memories 81, 83, 87, 91, 103, 109, 117 are in signal communication with an analysis unit 120, into which the fault signals generated in the fault memories can be read. In the analysis unit 120, an analysis matrix is stored, in which the fault signals from the fault memories 81, 83, 87, 91, 103, 109, 117 are merged.

For a comprehensive hydraulic system diagnosis, the analysis unit 120 uses the analysis matrix to analyze all the fault signals in combination. Thus in the analysis unit 120, a comparison of fault signals with acceptable, i.e. fault-free, functional diagnoses is finally performed, thereby enabling a qualified appraisal of the components installed in the hydraulic system. This appraisal is possible without dismantling of the hydraulic system and without external testing equipment/measuring technology. By testing components in the installed state (in the vehicle), a shortening of repair and maintenance times, a reliable detection of defective components, a decrease in repairs that must be repeated, and a savings on analysis test bench capacities are possible without the effort associated with dismantling.

The invention claimed is:

1. A hydraulic system for an automatic transmission, in particular a dual-clutch transmission, of a motor vehicle, comprising:
a high-pressure circuit, in which a pressure accumulator, at least one clutch, and gear selectors and at least one hydraulic pump are arranged, which is operated via an electronic control unit, wherein the pressure accumulator is connected via at least one hydraulic path to a hydraulic positioning cylinder, from which a control valve that can be operated by the control unit is connected upstream, wherein the control valve can adjust a hydraulic pressure applied to the hydraulic positioning cylinder, which control valve can be adjusted between two flow-through positions in order to displace a piston in opposing piston strokes via opposing piston positioning distances and piston speeds in the hydraulic positioning cylinder, wherein each piston stroke is linked to a hydraulic fluid removal from the hydraulic system, wherein the control unit includes a diagnostic module for performing delivery volume flow diagnosis, during which an analysis unit determines an actual delivery volume flow and compares the actual delivery volume flow to a target delivery volume flow and, if there is a significant deviation, diagnoses a fault which is stored in a delivery volume flow fault memory.

2. The hydraulic system according to claim 1, wherein to determine the actual delivery volume flow, in a diagnosis time interval, the diagnostic module operates the hydraulic pump in charging operation at at least one speed and operates the control valve in one of the flow-through positions, and the analysis unit determines the actual delivery volume flow on the basis of the piston speed resulting in charging operation and compares the actual delivery volume flow to the target delivery volume flow.

3. The hydraulic system according to claim 2, wherein the hydraulic positioning cylinder used for the delivery volume flow diagnosis is a gear selector hydraulic cylinder, from which a gear selector valve is connected upstream as the control valve.

4. The hydraulic system according to claim 2, wherein, within the diagnosis time interval, the accumulator pressure prevailing in the high-pressure circuit in the hydraulic path is kept constant to ensure that in pump charging operation, the pump delivery power is not additionally utilized for a pressure buildup of the accumulator pressure in the high-pressure circuit.

5. The hydraulic system according to claim 4, wherein a control pressure is kept at ambient pressure during the diagnosis time interval, wherein the high-pressure circuit is depressurized.

6. The hydraulic system according to claim 1, wherein the pressure accumulator is connected via at least one clutch path to a clutch hydraulic cylinder of the clutch, with which a hydraulic pressure applied to the clutch hydraulic cylinder is adjusted, and the control unit is assigned a pressure sensor, with which the hydraulic pressure applied to the clutch hydraulic cylinder is detected.

7. The hydraulic system according to claim 6, wherein the pressure sensor arranged in the clutch path is used during the delivery volume flow diagnosis to detect an actual accumulator pressure.

8. The hydraulic system according to claim 7, wherein before a start of the diagnosis time interval, the pressure accumulator is completely drained, whereby the actual accumulator pressure is reduced to ambient pressure.

9. The hydraulic system according to claim 8, wherein the reduction of the actual accumulator pressure to the ambient pressure takes place in a pressure reducing time interval, in which the hydraulic pump is deactivated, and the hydraulic positioning cylinder is actuated by operating its control valve until the ambient pressure is reached because of leakage-induced hydraulic liquid removal and because of actuation-induced hydraulic liquid removal.

10. The hydraulic system according to claim 9, wherein the presence of ambient pressure in the high-pressure circuit is determined by the position sensor, specifically for the case that the position sensor does not detect piston stroke travel in spite of operation of the control valve.

11. The hydraulic system according to claim 2, wherein, to avoid measurement inaccuracies during the diagnosis time interval, the piston speeds of a plurality of piston strokes are detected and the analysis unit forms a piston speed mean value therefrom, from which the actual delivery volume flow is computed.

* * * * *